United States Patent
Yoon et al.

(10) Patent No.: US 10,275,581 B2
(45) Date of Patent: Apr. 30, 2019

(54) METHOD AND APPARATUS FOR SHARING CONTENT BETWEEN ELECTRONIC DEVICES

(71) Applicant: Samsung Electronics Co., Ltd., Gyeonggi-do (KR)

(72) Inventors: Su-Ha Yoon, Seoul (KR); Su-Young Park, Gyeonggi-do (KR); Kwang-Sub Son, Gyeonggi-do (KR); In-Chul Lee, Gyeonggi-do (KR); Eui-Chang Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 300 days.

(21) Appl. No.: 14/705,322

(22) Filed: May 6, 2015

(65) Prior Publication Data

US 2015/0324605 A1    Nov. 12, 2015

(30) Foreign Application Priority Data

May 9, 2014   (KR) ........................ 10-2014-0055194

(51) Int. Cl.
| | |
|---|---|
| *H04L 29/06* | (2006.01) |
| *G06F 21/31* | (2013.01) |
| *G06F 21/62* | (2013.01) |
| *H04L 9/08* | (2006.01) |
| *H04L 29/08* | (2006.01) |
| *H04W 8/00* | (2009.01) |
| *H04W 4/80* | (2018.01) |

(52) U.S. Cl.
CPC .............. *G06F 21/31* (2013.01); *G06F 21/62* (2013.01); *G06F 21/6245* (2013.01); *H04L 9/0861* (2013.01); *H04L 63/0428* (2013.01); *H04L 67/06* (2013.01); *H04W 4/80* (2018.02); *H04W 8/005* (2013.01)

(58) Field of Classification Search
CPC .......... G06F 21/10; G06F 21/31; G06F 21/62; G06F 21/6245; H04L 9/0861; H04L 63/0428
USPC ...................... 726/26–30; 713/176, 189, 193
See application file for complete search history.

(56) References Cited

U.S. PATENT DOCUMENTS

| | | | | |
|---|---|---|---|---|
| 6,691,231 | B1 * | 2/2004 | Lloyd ................. | H04L 63/0428 713/164 |
| 7,111,172 | B1 * | 9/2006 | Duane ................. | H04L 63/0272 380/277 |
| 7,206,941 | B2 * | 4/2007 | Raley ...................... | G06F 21/10 705/51 |
| 7,269,735 | B2 * | 9/2007 | Raley ...................... | G06F 21/10 380/200 |

(Continued)

FOREIGN PATENT DOCUMENTS

| | | |
|---|---|---|
| JP | 2002-351444 | 12/2002 |
| JP | 2007-310639 | 11/2007 |
| KR | 10-2006-0094436 | 8/2006 |

*Primary Examiner* — Hosuk Song
(74) *Attorney, Agent, or Firm* — The Farrell Law Firm, P.C.

(57) ABSTRACT

A method of a first device and an electronic device are provided. The method includes receiving a request signal related to contents stored in the first device from a second device communicatively coupled to the first device; transmitting the contents to the second device in response to the request signal, wherein the contents are security applied contents; and releasing the security of the contents by authenticating a user related to the contents.

19 Claims, 17 Drawing Sheets

(56) References Cited

U.S. PATENT DOCUMENTS

| | | | |
|---|---|---|---|
| 7,523,488 B2* | 4/2009 | Chavis | G06F 21/31 |
| | | | 707/999.009 |
| 7,839,999 B2* | 11/2010 | Suzuki | G06F 21/602 |
| | | | 380/255 |
| 8,683,602 B2* | 3/2014 | Waller | G06F 21/10 |
| | | | 380/277 |
| 8,856,875 B2* | 10/2014 | Aditya | G06F 21/121 |
| | | | 380/277 |
| 2010/0231356 A1 | 9/2010 | Kim | |
| 2010/0240415 A1 | 9/2010 | Kim et al. | |
| 2011/0010761 A1* | 1/2011 | Doyle | G06F 21/6218 |
| | | | 726/5 |
| 2011/0287741 A1 | 11/2011 | Prabhu | |

* cited by examiner

METHOD AND APPARATUS FOR SHARING CONTENT BETWEEN ELECTRONIC DEVICES

PRIORITY

This application claims priority under 35 U.S.C. § 119(a) to a Korean Patent Application filed on May 9, 2014 in the Korean Intellectual Property Office and assigned Serial No. 10-2014-0055194, the entire content of which is hereby incorporated by reference.

BACKGROUND

1. Field of the Invention

The present disclosure relates generally to a method and an apparatus for sharing contents among a plurality of electronic devices and, more particularly, to a method and an apparatus for sharing contents which apply security processing to contents to be shared and require authentication through a source device of the contents to release the security processing.

2. Description of the Related Art

In general, a plurality of electronic devices may be connected to each other through wires or wirelessly to share contents (e.g., files or applications) stored in the plurality of electronic devices. Technologies for sharing contents among a plurality of electronic devices may be applied to different types of electronic devices as well as electronic devices of the same type. For example, technologies for sharing contents between smart phones and notebooks, between smart phones and Personal Computers (PCs), and between smart phones and tablet PCs may be applied.

Further, technologies may support various functions related to the sharing of contents. For example, technologies may support a function through which one electronic device may remotely control contents (e.g., files or applications) of an external device, or copy or more the contents of the external device to the a corresponding electronic device, so as to open or execute the contents of the external device through the corresponding electronic device.

Through technologies for sharing contents among the plurality of electronic devices, the electronic device may share contents of the external device and open or execute the shared contents. When the contents shared among the plurality of electronic devices have attributes (for example, privacy) requiring security, it is difficult to maintain security during a process of sharing the contents. For example, when the desktop PC reads contents of the smart phone from the smart phone and executes or controls the read contents, if the contents of the smart phone are copied or moved to the desktop PC, security of the copied or moved contents may not be maintained. Electronic devices which can be used by many users such as desktop PCs are less secure since the electronic devices may be exposed to users who are not allowed access to the corresponding contents.

SUMMARY

The present disclosure has been made to address the above-mentioned problems and disadvantages, and to provide at least the advantages described below. Accordingly, an aspect of the present disclosure provides a method and an apparatus for sharing contents which apply security processing to contents to be shared and require authentication through a source device of the contents to release the security processing.

In accordance with an aspect of the present disclosure, a method of a first device is provided. The method includes receiving a request signal related to contents stored in the first device from a second device communicatively coupled to the first device; transmitting the contents to the second device in response to the request, wherein the contents are security applied contents; and releasing the security of the contents by authenticating a user related to the contents.

In accordance with another aspect of the present disclosure a method of a second device is provided. The method includes transmitting a request signal related to contents stored in a first device to the first device communicatively coupled to the second device; receiving the contents from the first device in response to the request; and releasing security applied to the contents based on user authentication related to the contents, which is performed in the first device.

In accordance with another aspect of the present disclosure an electronic device is provided. The electronic device includes a request reception module configured to receive a request signal related to contents stored in the electronic device from another device communicatively coupled to the electronic device; a content transmission module configured to transmit the contents to the another device in response to the request, wherein the contents are security applied contents; and an authentication module configured to release the security of the contents by authenticating a user related to the contents.

In accordance with another aspect of the present disclosure an electronic device is provided. The electronic device includes a request transmission module configured to transmit a request signal related to contents stored in another device to the another device communicatively connected to the electronic device; a content reception module configured to receive the contents from the another device in response to the request; and a content providing module configured to release the security applied to the contents based on the authentication of the user related to the contents performed in the another device and displaying the contents in which the security processing is released, through a display functionally connected to the electronic device.

In accordance with an aspect of the present disclosure, a method of a first device is provided. The method includes receiving a request signal related to contents stored in the first device from a second device communicatively coupled to the first device; transmitting the contents to the second device in response to the request signal, wherein the contents are security applied contents; and authenticating a user related to the contents in order to release the security of the contents.

In accordance with another aspect of the present disclosure an electronic device is provided. The electronic device includes a request reception module configured to receive a request signal related to contents stored in the electronic device from another device communicatively coupled to the electronic device; a content transmission module configured to transmit the contents to the another device in response to the request signal, wherein the contents are security applied contents; and an authentication module configured to authenticate a user related to the contents in order to release the security of the contents.

BRIEF DESCRIPTION OF THE DRAWINGS

The above and other aspects, features, and advantages of the present disclosure will be more apparent from the following description, taken in conjunction with the accompanying drawings, in which.

DETAILED DESCRIPTION OF EMBODIMENTS OF THE PRESENT INVENTION

Figure 1:
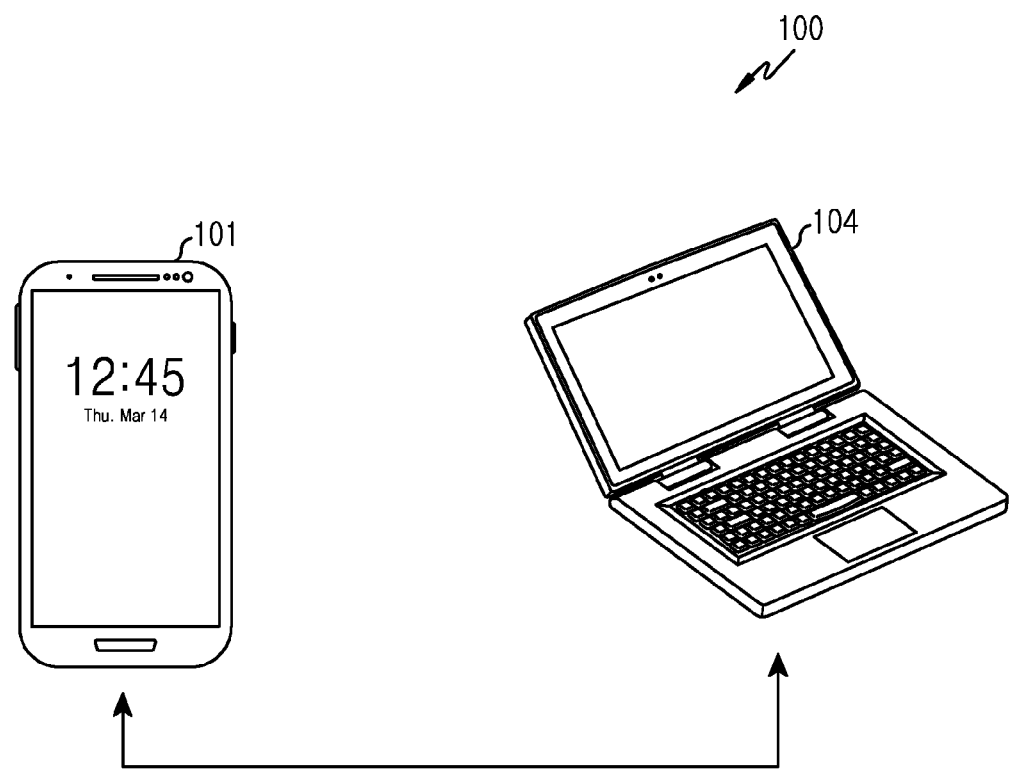
FIG. 1 illustrates a content sharing system according to an embodiment of the present disclosure.

Hereinafter, various embodiments of the present disclosure are described with reference to the accompanying drawings. The present disclosure may be modified in various forms and include various embodiments, but certain examples are illustrated in the accompanying drawings and described below. However, the description is not intended to limit the present disclosure to certain embodiments, and it shall be appreciated that all the changes, equivalents and substitutions belonging to the scope and spirit of the present disclosure are included in the present disclosure, as defined by the appended claims and their equivalents. In the description of the accompanying drawings, identical or similar reference numerals are used to designate identical or similar elements.

The terms "include" or "may include" refer to the existence of a corresponding disclosed function, operation or component which can be used in various embodiments of the present disclosure and does not limit one or more additional functions, operations, or components. In the present disclosure, terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expressions "or" and "at least one of A and/or B" include any or all combinations of the words listed together. For example, the expressions "A or B" or "at least A and/or B" may include A, B, or both A and B.

The expression "1," "2," "first," or "second" used in various embodiments of the present disclosure may modify various components of various embodiments but does not limit the corresponding components. For example, the above expressions do not limit the sequence and/or importance of the corresponding constituent elements. The expressions may be used to distinguish a component element from another component element. For example, a first user device and a second user device indicate different user devices although both of them are user devices. For example, without departing from the scope or spirit of the present disclosure, a first structural element may be referred to as a second structural element. Similarly, the second structural element may be referred to as the first structural element.

In the case where an element is referred to as being "connected to" or "accessed by" other elements, it should be understood that the element may be directly connected to or accessed by the other elements, but another element may also exist therebetween. In the case where an element is referred to as being "directly connected to" or "directly accessing by" other elements, it should be understood that there is no element therebetween.

In the present disclosure, the terms are used to describe certain embodiments of the present disclosure, and are not intended to limit the present disclosure. As used herein, the singular forms are intended to include the plural forms as well, unless the context dearly indicates otherwise.

Unless defined differently, all terms used herein, which include technical terminology or scientific terminology, have the same meaning as that understood by a person skilled in the art to which the present disclosure belongs. Such terms as those defined in a generally used dictionary are to be interpreted to have meanings equal to the contextual meanings in the relevant field of art, and are not to be interpreted to have ideal or excessively formal meanings unless clearly defined in the present disclosure.

An electronic device according to an embodiment of the present disclosure may be a device with a communication function. For example, an electronic device may include at least one of a smart phone, a tablet personal computer (PCs), a mobile phone, a video phone, an electronic book or e-book reader, a desktop PC, a laptop PC, a netbook computer, a personal digital assistant (PDA), a portable multimedia player (PMP), a moving picture experts group audio layer 3 (MP3) player, a mobile medical device, a camera, a wearable device (e.g., a head-mounted-device (HMD) such as electronic glasses, electronic clothes, an electronic bracelet, an electronic necklace, an electronic appcessory, an electronic tattoo, or a smart watch).

According to an embodiment of the present disclosure, an electronic device may be a smart home appliance with a communication function. A smart home appliance may include at least one of for example, televisions, digital video disk (DVD) players, audio players, refrigerators, air conditioners, cleaners, ovens, microwave ovens, washing machines, air purifiers, set-top boxes, TV boxes (e.g., HomeSync™ of Samsung, Apple TV™ or Google TV™), game consoles, electronic dictionaries, electronic keys, camcorders, or electronic frames.

According to an embodiment of the present disclosure, an electronic device may include at least one of various medical appliances (e.g. a magnetic resonance angiography (MRA)

machine, a magnetic resonance imaging (MRI) machine, a computed tomography (CT) machine, and an ultrasonic machine), navigation devices, global positioning system (UPS) receivers, event data recorders (EDRs), flight data recorders (FDRs), automotive infortainment devices, electronic equipments for ships (e.g. navigation equipments for ships, gyrocompasses, or the like), avionics, security devices, head units for vehicles, industrial or home robots, automatic teller machines (ATM) of banking facilities, and point of sales (POSs) of vendors.

According to an embodiment of the present disclosure, an electronic device may include at least one of furniture or a part of a building/structure, an electronic board, an electronic signature receiving device, a projector, and various types of measuring devices (for example, a water meter, an electric meter, a gas meter, a radio wave meter and the like) including a camera function. An electronic device according to an embodiment of the present disclosure may be a combination of one or more of the above described various devices. Also, an electronic device according to an embodiment of the present disclosure may be a flexible device. Also, an electronic device according to an embodiment of the present disclosure is not limited to the above described devices.

Hereinafter, an electronic device according to an embodiment of the present disclosure is described with reference to the accompanying drawings. In an embodiment of the present disclosure, the term "user" may indicate a person using an electronic device or a device (e.g. an artificial intelligence electronic device) using an electronic device.

FIG. 1 illustrates a content sharing system 100 according to an embodiment of the present disclosure.

Referring to FIG. 1, the content sharing system 100 includes a first electronic device 101 and a second electronic device 104. According to an embodiment of the present disclosure, the first electronic device 101 may be a mobile device such as a mobile phone or a tablet PC.

According to an embodiment of the present disclosure, the second electronic devices 104 may be a device which is the same as the first electronic device 101 (for example, the same type of device) or another device (for example, a different type of device). According to an embodiment of the present disclosure, the second electronic device 104 may be a user device such as a desktop PC or a laptop PC which operates independently from the first electronic device 101. The second electronic device 104 may be a computing device which may be connected to communicate with the first electronic device 101, so as to share contents (or files or applications) stored in the first electronic device 101 and may display information of the contents (or files or applications) stored in the first electronic device 101 through a display of the second electronic device 104.

According to an embodiment of the present disclosure, the second electronic device 104 may be a sub electronic device which may be linked with the first electronic device 101 to perform at least some functions of the first electronic device 101 (for example, a notification service, phone call service, service for identifying email or messages (for example, messages transmitted/received through a Short Message Service (SMS), Multimedia Messaging Service (MMS), Social Networking Service (SNS), Instant Messaging (IM) service or the like), or biometric data sensing service including exercise quantity measurement). The second electronic device 104 may be a wearable device such as an HMD including a smart watch or electronic glasses, electronic clothes, an electronic bracelet, an electronic necklace, or an electronic appcessory, which may be located close to the first electronic device 101 and directly worn on a user's body.

According to an embodiment of the present disclosure, the first electronic device 101 is connected to the second electronic device 104 to communicate with the second electronic device 104. The first electronic device 101 may be connected through a wired or wireless communication scheme. According to an embodiment of the present disclosure, the first electronic device 101 is connected to the second electronic device 104 through, for example, a short-range communication scheme. The first electronic device 101 may be connected to the second electronic device 104 through an interface such as a high-definition multimedia interface (HDMI), a universal serial bus (USB), or a device according to an infrared data association (IrDA) standard. Alternatively, the first electronic device 101 may transmit/receive information, data, or contents to/from the second electronic device 104 based on various wireless communication standards such as bluetooth (BT), bluetooth low energy (BLE), wireless fidelity (WiFi), WiFi Direct, wireless gigabit alliance (WiGig), ultra wideband (UWB), or Zigbee. The above listed standards merely correspond to certain embodiments of the present disclosure. However, the present disclosure is not limited to any particular interface or communication standard.

According to an embodiment of the present disclosure, when the second electronic device 104 is connected to communicate with the first electronic device 101, contents (or files or applications) stored in the first electronic device 101 may be provided to a user through the second electronic device 104.

According to an embodiment of the present disclosure, after performing security processing on contents (or files or applications) to be provided to the user through the second electronic device 104, the first electronic device 101 may transmit the contents to the second electronic device 104. The security processing may include, for example, encryption, hiding settings, piggybacking, notification setting, or watermarking.

According to an embodiment of the present disclosure, the first electronic device 101 may perform user authentication to release the security processing on the contents (or files or applications) transmitted to the second electronic device 104. According to an embodiment of the present disclosure, the second electronic device 104 may make a request for authenticating the corresponding user to the first electronic device 101 in response to user access to corresponding contents (or files or applications) through the second electronic device 104, and may receive additional information related to the corresponding contents (or files or applications) from the first electronic device 101 in response to the request. According to an embodiment of the present disclosure, the second electronic device 104 may release the security processing (security) applied to the contents (or files or applications) based on the additional information.

Figure 2:
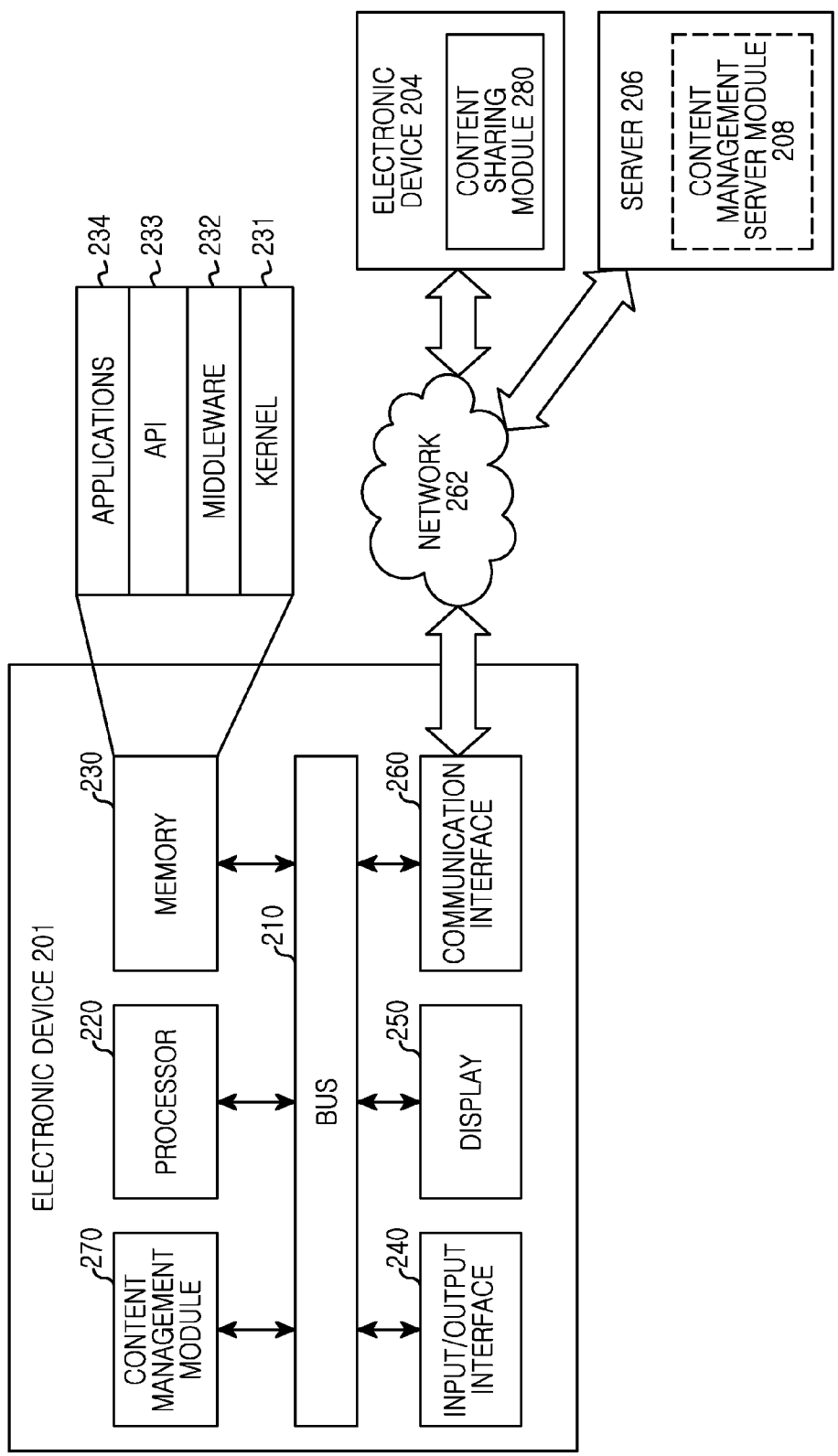
FIG. 2 is a block diagram of an electronic device according to an embodiment of the present disclosure.

FIG. 2 is a block diagram of an electronic device 201 according to an embodiment of the present disclosure. Referring to FIG. 2, the electronic device 201 (for example, the first electronic device 101) includes a bus 210, a processor 220, a memory 230, an input/output interface 240, a display 250, a communication interface 260, and a content management module 270.

The bus 210 is a circuit for connecting the aforementioned components and transmitting communication (for example, a control message) between the aforementioned components.

For example, the processor 220 may receive instructions from the aforementioned other components (for example, the memory 230, the input/output interface 240, the display 250, the communication interface 260, or the content management module 270) through the bus 210, decipher the received instructions, and perform calculations or process data according to the deciphered instructions.

The memory 230 stores instructions or data received from or created by the processor 220 or the other components (for example, the input/output interface 240, the display 250, the communication interface 260, and the content management module 270). The memory 230 may include programming modules, for example, a kernel 231, middleware 232, an Application Programming Interface (API) 233, and applications 234. Each of the programming modules may be implemented in software, firmware, hardware, or a combination of two or more thereof.

The kernel 231 controls or manages system resources (for example, the bus 210, the processor 220, or the memory 230) used for executing an operation or a function implemented in the remaining other programming modules, for example, the middleware 232, the API 233, or the applications 234. In addition, the kernel 231 provides an interface through which the middleware 232, the API 233, or the applications 234 may control or manage the individual components of the electronic device 201 while accessing the individual components.

The middleware 232 serves as an intermediary that allows the API 233 or the applications 234 to communicate with the kernel 231, so as to exchange data. Furthermore, with regard to task requests received from the applications 234, the middleware 232 may perform a control (for example, scheduling or load balancing) for the task requests using, for example, a method of assigning a priority for using the system resources (for example, the bus 210, the processor 220, and the memory 230) of the electronic device 201 to at least one of the applications 234.

The API 233 is an interface through which the applications 234 control functions provided by the kernel 231 or the middleware 232 and include at least one interface or function (for example, instructions) for file control, window control, image processing, or text control.

According to an embodiment of the present disclosure, the applications 234 may include a Short Message Service (SMS)/Multimedia Message Service (MMS) application, an e-mail application, a calendar application, an alarm application, a health care application (for example, an application for measuring a work rate or a blood sugar level), an environment information application (for example, an application for providing atmospheric pressure, humidity, or temperature information). Additionally or alternatively, the applications 234 may include an application related to an information exchange between the electronic device 201 and an external electronic device (for example, an electronic device 204). The application related to the exchange of information may include, for example, a notification relay application for transferring predetermined information to the external electronic device or a device management application for managing the external electronic device.

For example, the notification relay application may include a function of transferring, to the external electronic device (for example, the electronic device 204), notification information generated from other applications of the electronic device 201 (for example, an SMS/MMS application, an e-mail application, a health management application, an environmental information application, and the like). Additionally or alternatively, the notification relay application may receive notification information from, for example, the external electronic device (for example, the electronic device 204) and provide the received notification information to a user. For example, the device management application may manage (for example, install, delete, or update) functions for at least a part of the external electronic device (for example, the electronic device 204) communicating with the electronic device 201 (for example, turning on/off the external electronic device (or some elements thereof) or adjusting brightness (or resolution) of a display), applications operating in the external electronic device, or services (for example, a telephone call service or a message service) provided from the external electronic device.

According to an embodiment of the present disclosure, the applications 234 may include an application set on the basis of an attribute (for example, a type) of the external electronic device (for example, the electronic device 204). For example, when the external electronic device is an Min player, the applications 234 may include an application related to the reproduction of music. Similarly, when the external electronic device is a mobile medical appliance, the applications 234 may include an application related to health care. According to an embodiment of the present disclosure, the applications 234 may include at least one of an application designated to the electronic device 201 and an application received from the external electronic device (for example, a server 206 or the electronic device 204).

The input/output interface 240 transfers instructions or data input from a user through an input/output device (for example, a sensor, a keyboard, or a touch screen) to, for example, the processor 220, the memory 230, the communication interface 260, or the content management module 270 through the bus 210. For example, the input/output interface 240 may provide the processor 220 with data for a user's touch input through the touch screen. Furthermore, through the input/output device (for example, a speaker or a display), the input/output interface 240 may output instructions or data received from the processor 220, the memory 230, the communication interface 260, or the content management module 270 through the bus 210. For example, the input/output interface 240 may output voice data, processed through the processor 220, to a user through a speaker.

The display 250 displays various pieces of information (for example, multimedia data or text data) to a user.

The communication interface 260 establishes communication between the electronic device 201 and an external electronic device (for example, the electronic device 204 or the server 206). For example, the communication interface 260 may be connected to a network 262 through wireless or wired communication to communicate with an external device. The wireless communication may include at least one of, for example, wireless fidelity (Wi-Fi), bluetooth (BT), near field communication (NFC), a global positioning system (GPS), and cellular communication (for example, long term evolution (LTE), LIE-advanced (LTE-A), code division multiple access (CDMA), wideband CDMA (WCDMA), universal mobile telecommunication system (UMTS), wireless broadband (WiBro), or global system for mobile communication (GSM)). The wired communication may include at least one of, for example, a universal serial bus (USB), a high definition multimedia interface (HDMI), recommended standard 232 (RS-232), and a plain old telephone Service (POTS).

According to an embodiment of the present disclosure, the network 262 may be a telecommunication network. The communication network may include at least one of a computer network, the Internet, the Internet of Things, or a telephone network. According to an embodiment of the present disclosure, a protocol (for example, a transport layer protocol, a data link layer protocol, or a physical layer protocol) for communication between the electronic device 201 and the external device may be supported by at least one of the applications 234, the application programming interface 233, the middleware 232, the kernel 231, and the communication interface 260.

According to an embodiment of the present disclosure, the server 206 supports the driving of the electronic device 201 by performing at least one operation (or function) implemented in the electronic device 201. For example, the server 206 may include a content management server module 20 capable of supporting the content management module 270 implemented in the electronic device 201. For example, the content management server module 20S may include at least one component of the content management module 270, and may perform (for example, perform as a proxy) at least one operation performed by the content management module 270. The content management server module 20 may be, for example, an online market server (for example, an application (or app) store) which provides or sells contents or applications which can be installed in the electronic device 201.

The content management module 270 processes at least some pieces of information acquired from the other components (for example, the processor 220, the memory 230, the input/output interface 240, and the communication interface 260), and provides the processed information to a user through various methods. The content management module 270 controls at least some functions of the electronic device 201 to provide the user with contents stored in the memory 230 through another electronic device (for example, the second electronic device 104) by using, for example, the processor 220 or independently from the processor 220. Hereinafter, additional information on the content management module 270 is provided below with reference to FIGS. 3A and 3B.

Figure 3A:
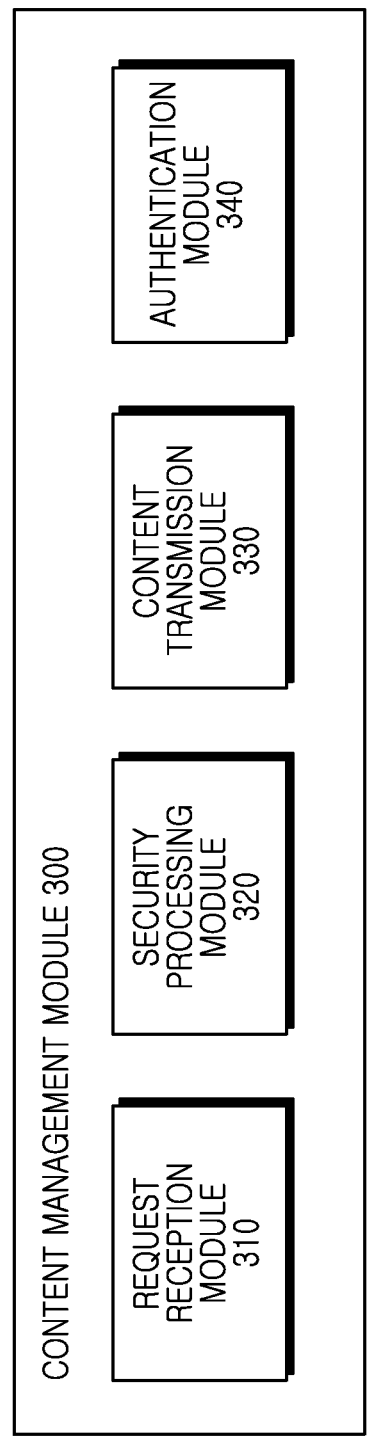
FIG. 3A is a block diagram of a content management module of an electronic device according to an embodiment of the present disclosure.

FIG. 3A is a block diagram of a content management module 300 of an electronic device (for example, the first electronic device 101) according to an embodiment of the present disclosure.

Referring to FIG. 3A, the content management module 300 (for example, the content management module 270) includes a request reception module 310, a security processing module 320, a content transmission module 330, and an authentication module 340.

The request reception module 310 receives a request (request signal) related to contents stored in the electronic device from an external device (for example, the second electronic device 104) communicatively coupled to the electronic device (for example, the first electronic device 101). According to an embodiment of the present disclosure, the external device may be connected to the electronic device through, for example, a wired/wireless communication scheme or a short-range communication scheme.

The security processing module 320 performs security processing on contents corresponding to the request in response to the request received by the request reception module 310. According to an embodiment of the present disclosure, the security processing module 320 determines whether to perform security processing based on attributes of the contents. According to an embodiment of the present disclosure, the attributes of the contents which correspond to a determination whether to perform security processing may be configured as, for example, at least one of the attributes (for example, "public") which do not require security processing and the attributes (for example, "privacy") which require security processing. Alternatively, the attributes may not require security processing only under a predetermined condition (for example, a particular user account) and may require security processing in the remaining cases, or vice versa. According to an embodiment of the present disclosure, the attributes of the contents may be determined based on, for example, information recorded in a header of the corresponding contents or attributes of a group (for example, a directory, domain, or user account) including the corresponding contents.

According to an embodiment of the present disclosure, the security processing module 320 may omit security processing when the stored contents have already been security-processed. When contents which are provided or purchased from an external device (for example, the server 206) have already been security processed and stored, the security processing module 320 may maintain the storage state without additional security processing.

According to an embodiment of the present disclosure, the security processing module 320 generates, for example, an encryption key related to the contents. The security processing module 320 may encrypt the contents based on the encryption key through, for example, at least some of the security processing on the contents. According to an embodiment of the present disclosure, the security processing module 320 may generate an encryption key for security processing based on, for example, one of a user's finger print information, a user's iris information, a user's voice information, a user's face information, a user's biometric information, a lock pattern, a password, time information related to a time when the encryption key is generated, or a combination of two or more thereof. According to an embodiment of the present disclosure, the encryption key may be, for example, a One Time Password (OTP).

According to an embodiment of the present disclosure, the security processing module 320 may configure hiding-related attributes of the contents so that a display of the contents through the external device (for example, the second electronic device 104) is restricted through, for example, at least some of the security processing on the contents. According to an embodiment of the present disclosure, the hiding-related attributes of the contents may be configured as, for example, at least one of the attributes (for example, "visible") which do not require hiding processing and the attributes (for example, "hidden") which require hiding processing.

According to an embodiment of the present disclosure, as at least some of the security processing on the contents, the security processing module 320 adds information to the contents related to a user having a right to access the contents (for example, piggybacking). According to an embodiment of the present disclosure, when the external device (for example, the second electronic device 104) receives the contents to which the information related to the user is added and detects user access to the corresponding contents, the external device (for example, the second electronic device 104 or the electronic device 204) determines whether the user has the right to access the corresponding contents. Alternatively, as at least some of the processes for displaying the corresponding contents, the external device displays the information related to the user.

According to an embodiment of the present disclosure, as at least some of the security processing on the contents, the security processing module 320 configures notification-related attributes of the corresponding contents. According to an embodiment of the present disclosure, when the external device (for example, the second electronic device 104) receives the contents having the configured notification-related attributes and detects user access to the corresponding contents, the external device transmits a notification to the electronic device (for example, the first electronic device 101) based on the notification-related attributes of the corresponding contents.

According to an embodiment of the present disclosure, as at least some of the security processing on the contents, the security processing module 320 inserts a watermark into the corresponding contents. According to an embodiment of the present disclosure, when the external device (for example, the second electronic device 104) receives the watermarked contents and detects user access to the corresponding contents, the external device displays the inserted watermark as at least some of the display of the corresponding contents or to overlap the corresponding contents.

The content transmission module 330 transmits the contents security-processed by the security processing module 320 to the external device (for example, the second electronic device 104) in response to the request received by the request reception module 310.

With respect to the corresponding contents, the authentication module 340 authenticates a user related to the corresponding contents in order to release the security processing performed by the security processing module 320. According to an embodiment of the present disclosure, the authentication module 340 may receive an additional request (request signal) for additional information for releasing the security processing applied to the contents from the external device (for example, the second electronic device 104).

According to an embodiment of the present disclosure, the authentication module 340 receives authentication information from the user in response to the received additional request. The authentication module 340 displays a user interface for receiving authentication information on the display and extracts the authentication information from a user input to the user interface. The authentication information may include, for example, at least one of a user's finger print information, a user's iris information, a user's voice information, a user's face information, a user's biometric information, a lock pattern, and a password.

The authentication module 340 authenticates whether the user has the right to access the corresponding contents based on the extracted authentication in a state where security processing applied to the contents is released. According to an embodiment of the present disclosure, the authentication module 340 generates additional information for releasing security processing when the user is successfully authenticated. The authentication module 340 transmits the generated additional information to the external device by using a communication channel through which security-processed contents are transmitted or a separate communication channel with the external device (for example, the second electronic device 104). According to an embodiment of the present disclosure, when the existing connection with the external device (for example, the second electronic device 104) is disconnected, the authentication module 340 transmits additional information in a separate message to the external device through an external network (for example, a cellular network or an internet protocol (IP) network) of the electronic device.

According to an embodiment of the present disclosure, the additional information may include, for example, at least one of a decryption key of contents, a message for accepting or rejecting the release of security processing, a term related to the release of security processing, and the number of times by which access is accepted. As at least some of the additional information, the authentication module 340 may generate a decryption key of the contents based on, for example, at least one of authentication information and time information related to a time when the additional information is generated.

Figure 3B:
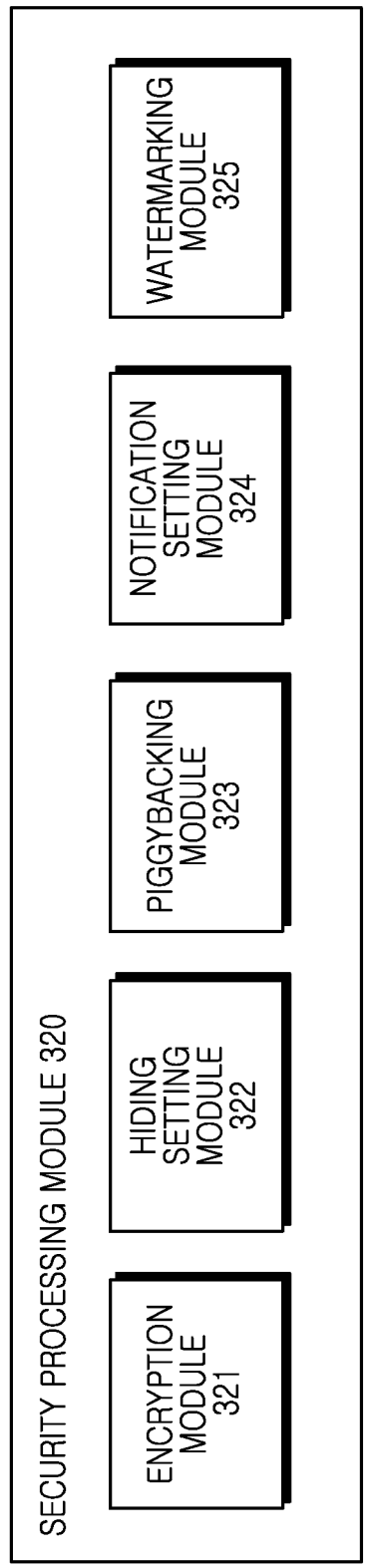
FIG. 3B is a block diagram of a security processing module of an electronic device according to an embodiment of the present disclosure.

FIG. 3B is a block diagram of a security processing module 320 of the electronic device (for example, the first electronic device 101) according to an embodiment of the present disclosure.

Referring to FIG. 3B, the security processing module 320 includes an encryption module 321, a hiding setting module 322, a piggybacking module 323, a notification setting module 324, and a watermarking module 325.

The encryption module 321 encrypts, for example, contents. According to an embodiment of the present disclosure, the encryption module 321 generates, for example, an encryption key for encryption. According to an embodiment of the present disclosure, the encryption module 321 generates an encryption key based on, for example, at least one of a user's finger print information, a user's iris information, a user's voice information, a user's face information, a user's biometric information, a lock pattern, a password, time information related to a time when the encryption key is generated, or a combination of two or more thereof.

According to an embodiment of the present disclosure, the encryption module 321 generates an encryption key having a time varying characteristic of which a value varies depending on the time based on, for example, at least time information. When the encryption key has the time varying characteristic, a decryption key corresponding to the encryption key also has the time varying characteristic. When the encryption key has the time varying characteristic, although another device receives and stores the decryption key corresponding to the encryption key, the stored decryption key may not be re-used for releasing (e.g. decrypting) the encryption conducted by the corresponding encryption key after a predetermined time lapses. Contents encrypted by the encryption key having the time varying characteristic also have the time varying characteristic like the encryption key. Although another device having received security processed contents receives the encryption key and temporarily releases (for example, decrypts) the security processing (for example, encryption) temporarily applied to the contents, the security processing (for example, encryption) applied to the contents may not be released (for example, decrypted) after a predetermined time lapses.

The hiding setting module 322 sets hiding-related attributes of contents to hide security-processed contents on the external device (for example, the second electronic device 104) such that the security-processed contents are not displayed or are hid from the user's view. According to an embodiment of the present disclosure, the hiding-related attributes of the contents may be configured as, for example, at least one of the attributes (for example, "visible") which do not require hiding processing and the attributes (for example, "hidden") which require hiding processing.

The piggybacking module 323 adds information related to a user, who has the right to access the security-processed contents, to the corresponding contents (for example, piggybacking), so as to provide the information related to the user to the external device (for example, the second electronic device 104) which will receive the contents. According to an embodiment of the present disclosure, the external device (for example, the second electronic device 104) allows a user who has the right to access corresponding contents to access the corresponding contents based on information related to the user which was added to the security-processed contents.

When user access to security-processed contents is detected in the external device (for example, the second electronic device 104), the notification setting module 324 sets notification-related attributes of the contents so that the electronic device (for example, the first electronic device 101) may recognize the user access. According to an embodiment of the present disclosure, the notification-related attributes of the contents may include, for example, information on a device to receive notification (for example, the first electronic device 101) as well as information on whether to transmit the notification.

The watermarking module 325 inserts a watermark related to the corresponding contents (for example, watermarking) to prevent unauthorized copies of the contents security-processed by displaying the watermark on at least some of the display of the security-processed contents or overlappingly the corresponding contents.

Figure 4:
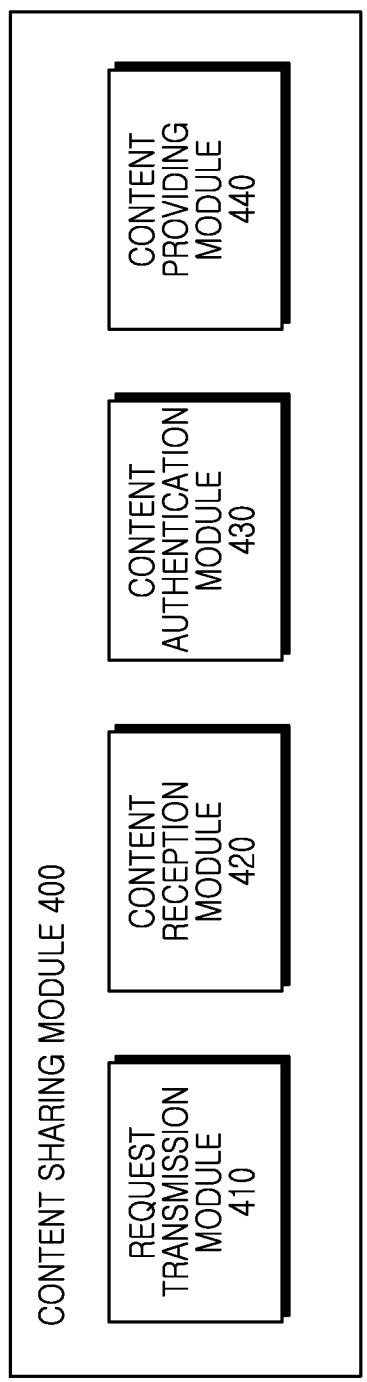
FIG. 4 is a block diagram of a content sharing module of an electronic device according to an embodiment of the present disclosure.

FIG. 4 is a block diagram of a content sharing module 400 of the electronic device (for example, the second electronic device 104) according to an embodiment of the present disclosure.

Referring to FIG. 4, the content sharing module 400 (for example, the content sharing module 280) includes a request transmission module 410, a content reception module 420, a content authentication module 430, and a content providing module 440.

The request transmission module 410 transmits a request related to contents stored in another device for example, the first electronic device 101) to the other device external to the electronic device.

The content reception module 420 receives from the other device contents corresponding to the request from the other device (for example, the first electronic device 101) having received the request, in response to the request transmitted from the request transmission module 410.

The content authentication module 430 authenticates a user related to the corresponding contents by using the other device (for example, the first electronic device 101) that transmitted the contents.

According to an embodiment of the present disclosure, the content authentication module 430 makes a request for authenticating the user related to the corresponding contents to the other device (for example, the first electronic device 101) that transmitted the contents. The content authentication module 430 receives additional information (for example, a decryption key of contents, a message for accepting/rejecting the release, a release duration, or the number of times access is accepted) for releasing security processing from the other device (for example, the first electronic device 101) that received the request for the user authentication in response to the request for the user authentication. According to an embodiment of the present disclosure, as at least some of the user authentication, the content authentication module 430 determines whether a user of the electronic device has a right to access the contents based on user information inserted (e.g. piggybacked) into the contents.

The content providing module 440 releases the security processing applied to the contents based on the authentication by the content authentication module 430. The content providing module 440 provides the user with the security processing-released contents in various ways such as expressions related to the contents (for example, display, sound, or vibration).

According to an embodiment of the present disclosure, the content providing module 440 displays, for the user, contents in different ways according to whether the security processing is released. According to an embodiment of the present disclosure, the content providing module 440 provides expressions corresponding to a state where the security processing of the contents is released, or open or execute the corresponding contents based on a user input for the security processing-released contents. According to an embodiment of the present disclosure, the content providing module 440 does not display security processing information inserted into the corresponding contents, for example, piggybacking information or a watermark during the process of providing expressions corresponding to a state where the security processing of the contents is released, or opening or executing the corresponding contents.

According to an embodiment of the present disclosure, the content providing module 440 controls a display such that the contents are not output to the display or hidden from the user's view as the expressions corresponding to the state where the contents are security-processed. According to an embodiment of the present disclosure, the content providing module 440 restrictively expresses some pieces of information related to the corresponding contents and prevents the corresponding contents from being opened or executed. According to an embodiment of the present disclosure, the content providing module 440 displays security processing information inserted into the corresponding contents, for example, piggybacking information or watermark. According to an embodiment of the present disclosure, the content providing module 440 transmits a notification related to user access to the corresponding contents to another device (for example, the first electronic device 101) which is a source device of the corresponding contents in response to the user access to the corresponding contents.

According to an embodiment of the present disclosure, the content providing module 440 detects an event generated in the electronic device after the security processing is released and reconstructs (e.g. reapplies) the security processing to the security processing-released contents in response to the detected event. A reconstruction-related event may be generated, for example, when a predetermined time lapses after the security-processed contents are received, when a connection between the electronic device and another device (for example, the first electronic device 101) is disconnected or a predetermined time lapses after the disconnection, when a predetermined time lapses after a user is authenticated through another device (for example, the first electronic device 101), or when a user input for releasing user authentication is received.

According to an embodiment of the present disclosure, an electronic device (for example, the first electronic device 101) includes a request reception module for receiving a request signal related to contents stored in the electronic device from another device (for example, the second electronic device 104) communicatively coupled to the electronic device; a content transmission module for transmitting the contents to the other device in response to the request signal, wherein the contents are security applied contents; and an authentication module for authenticating a user related to the contents in order to release the security for the contents.

According to an embodiment of the present disclosure, the electronic device is connected to the other device through a wired or wireless communication scheme.

According to an embodiment of the present disclosure, the electronic device includes a security processing module for determining whether to perform security processing on the contents based on attributes of the contents, and performing the security processing to the contents based on the determination.

According to an embodiment of the present disclosure, the attributes of the contents may be determined based on information recorded in a header of the contents or attributes of a higher group including the contents.

According to an embodiment of the present disclosure, the security processing module generates an encryption key related to the contents, and encrypts the contents based on the encryption key.

According to an embodiment of the present disclosure, the security processing module generates an encryption key based on at least one of a user's fingerprint information, a user's iris information, a user's voice information, a user's face information, a user's biometric information, a lock pattern, a password, and time information related to a time when the encryption key is generated.

According to an embodiment of the present disclosure, the security processing module sets hiding-related attributes of the contents such that the contents are hidden from a view of a user of the second device as at least some of the security processing.

According to an embodiment of the present disclosure, the security processing module adds information related to a right to access the contents to the contents as at least some of the security processing.

According to an embodiment of the present disclosure, the security processing module sets notification-related attributes of the contents such that notification of user access to the contents is transmitted to the first device as at least some of the security processing.

According to an embodiment of the present disclosure, the security processing module inserts a watermark related to the contents into the contents.

According to an embodiment of the present disclosure, the authentication module receives an additional request signal for additional information for releasing the security processing from the second device, receives authentication information from the user in response to the additional request, authenticates whether the user has a right to access the contents based on the authentication information, generates the additional information when the authentication is successful, and transmits the additional information to the second device in response to the request for the additional information.

According to an embodiment of the present disclosure, the authentication module displays a user interface for receiving the authentication information by using a display functionally connected to the first device, and extracts the authentication information from a user input related to the user interface.

According to an embodiment of the present disclosure, the authentication information includes at least one of a user's fingerprint information, a user's iris information, a user's voice information, a user's face information, a user's biometric information, a lock pattern, and a password.

According to an embodiment of the present disclosure, the additional information includes at least one of a decryption key of the contents, a message for accepting or rejecting release of the security, a term related to the release of the security, and the number of times by which access is accepted.

According to an embodiment of the present disclosure, the authentication module generates, as at least some of the additional information, a decryption key of the contents based on at least one piece of authentication information and time information related to a time when the additional information is generated.

According to an embodiment of the present disclosure, the authentication module receives the additional request signal by wing at least one of a short-range communication connection between the first device and the second device and an external network of the first device and the second device.

According to an embodiment of the present disclosure, the authentication module receives the additional request signal by using at least one of a short-range communication connection between the first device and the second device and an external network of the first device and the second device.

According to an embodiment of the present disclosure, an electronic device (for example, the second electronic device 104) includes a request transmission module for transmitting a request signal related to contents stored in another device (for example, the first electronic device 101) to the other device communicatively connected to the electronic device; a content reception module for receiving the contents from the other device in response to the request; and a content providing module for releasing the security applied to the contents based on the authentication of the user related to the contents performed in the other device and displaying the contents in which the security processing is released, through a display functionally connected to the electronic device.

According to an embodiment of the present disclosure, the other device are connected to the electronic device through a wired or wireless communication scheme.

According to an embodiment of the present disclosure, the content providing module acquires user information related to the contents from the contents, determines whether the user has a right to access the contents based on the user information, and releases the security based on the determination, by the second device.

According to an embodiment of the present disclosure, the content providing module displays, for a user, an expression corresponding to a state where the security is released through a display functionally connected to the second device.

According to an embodiment of the present disclosure, the content providing module displays, for a user, a first expression corresponding to a state where the security is not released through a display functionally connected to the second device, where the first expression is different from a second expression corresponding to a state where the security is released.

According to an embodiment of the present disclosure, the content providing module hides contents in which the security is not released from the view of a user of the second device.

According to an embodiment of the present disclosure, the content providing module transmits a message related to contents to the other device in response to user access to the contents.

According to an embodiment of the present disclosure, the content providing module acquires a watermark related to contents from the contents, and displays the watermark as at least some of the first expression or to overlap at least some of the first expression.

According to an embodiment of the present disclosure, the content providing module makes a request for authenticating a user related to the contents to the first device, and receives additional information for releasing the security from the first device in response to the request.

According to an embodiment of the present disclosure, the content providing module releases security based on at least additional information.

According to an embodiment of the present disclosure, additional information includes at least one of a decryption key of contents, a message for accepting or rejecting release of security, a term related to the release of the security, and a number of times by which access is accepted.

According to an embodiment of the present disclosure, a content providing module detects a certain event generated in a second device, and reconstructs security in the contents in which the security is released in response to the event.

Figure 5:
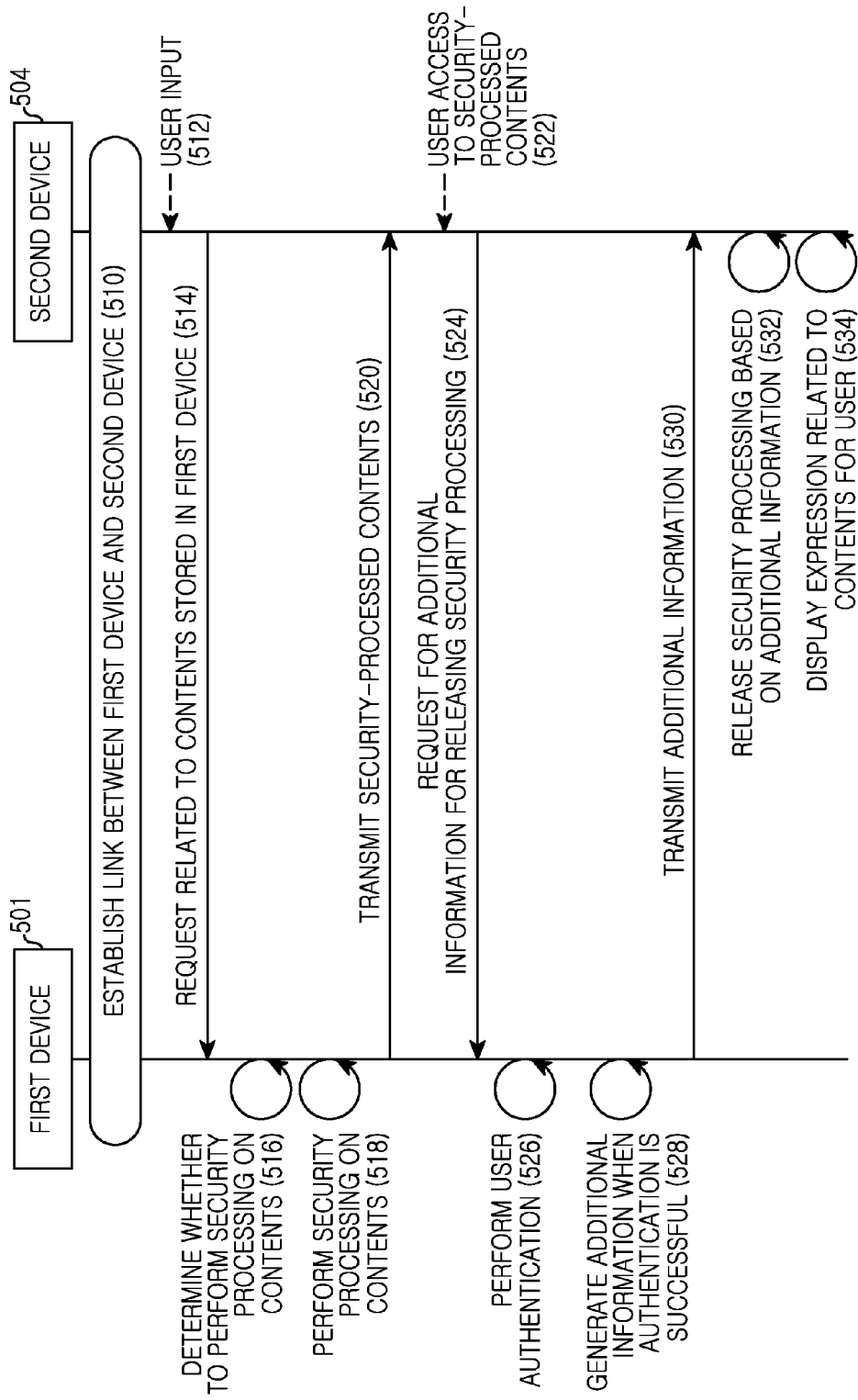
FIG. 5 is a flow diagram of a method of sharing contents among a plurality of electronic devices according to an embodiment of the present disclosure.

FIG. 5 is a flow diagram of a method of sharing contents among a plurality of electronic devices according to an embodiment of the present disclosure.

Referring to FIG. 5 the plurality of electronic devices include a first device 501 (for example, the first electronic device 101) and a second device 504 (for example, the second electronic device 104).

In operation 510, the first device 501 and the second device 504 establish, for example, a communication link for sharing contents between the first device 501 and the second device 504. According to an embodiment of the present disclosure, the first device 501 and the second device 504 transmit/receive for example, contents to be shared, information related to the corresponding contents, a request or response related to the sharing of the corresponding contents, and an event or notification generated in connection with the corresponding contents by using the communication link established in operation 510.

In operation 512, the second device 504 receives, for example, a user input related to the second device 504.

When the user input received in operation 512 corresponds to a request related to the first device 501 (for example, a request for sharing, moving, or copying contents), the second device 504 transmits a request related to the contents stored in the first device 501 to the first device 501 in response to the corresponding user input in operation 514. According to an embodiment of the present disclosure, the request in operation 514 is generated by the first device 501 based on the user input received in operation 512. According to an embodiment of the present disclosure, the request in operation 514 is transmitted by the first device 501 through the use of the communication link established in operation 510.

In operation 516, the first device 501 determines whether to perform security processing on the contents based on attributes of the contents. According to an embodiment of the present disclosure, the attributes of the contents are determined based on, for example, information recorded in a header of the corresponding contents or attributes of a group (for example, a directory, domain, or user account) including the corresponding contents. According to an embodiment of the present disclosure, the attributes of the contents are designated as a value (for example, "public" or "private") indicating whether to perform the security processing or designated as information related to conditions requiring the security processing (for example, the second device 504 or a user of the second device 504). According to an embodiment of the present disclosure, the attributes of the contents include at least one of sub attributes according to a type of security processing, for example, encryption-related attributes, hiding-related attributes, piggybacking-related attributes, notification-related attributes, and watermark-related attributes.

In operation 518, the first device 501 performs security processing on the corresponding contents based on the determination whether to perform the security processing in operation 516. According to an embodiment of the present disclosure, the first device 501 generates security-processed contents by performing the security processing to original contents stored in a memory functionally connected to the first device 501. According to an embodiment of the present disclosure, the security processing which can be applied to the corresponding contents includes, for example, encryption, hiding setting, piggybacking, notification setting, or watermarking.

In operation 520, the first device 501 transmits the security-processed contents to the second device 504. According to an embodiment of the present disclosure, when the second device 504 receives the security-processed contents from the first device 501 in response to the user input in operation 512, the second device 504 provides an interface by which the user can access the received security-processed contents to the user through a display functionally connected to the second device 504.

In operation 522, the second device 504 recognizes the user access to the security-processed contents by using the interface displayed on the display functionally connected to the second device 504. According to an embodiment of the present disclosure, the second device 504 provides (for example, displays, executes, or reproduces) the contents through the display functionally connected to the second device 504.

The second device 504 provides the contents based on, for example, whether the contents are security-processed, the type of security processing, a predetermined condition related to security processing, an event detected after security processing is released, or a user involved in the user access. According to an embodiment of the present disclosure, when the contents are security-processed, the second device 504 restrictively displays or does not display (e.g. hides the security-processed contents from the user's view) the security-processed contents or performs a function (for example, a function of transmitting notification to the first device 501) related to security processing simultaneously with the displaying of the contents. According to an embodiment of the present disclosure, the second device 504 provides the contents to which security processing has been applied when the predetermined condition related to the security processing is met, and provides the contents from which the security processing has been released when the predetermined condition is not met. The predetermined condition related to the security processing may correspond to, for example, a case where the first device 501 and the second device 504 are communicatively connected to each other, a case where the user corresponding to the user access is authenticated as a user who has the right to access the contents by at least one of the first device 501 and the second device 504.

According to an embodiment of the present disclosure, the second device 504 detects an event generated in connection with the second device 504 after the security processing is released and reconstructs (e.g. reapplies) the security processing in the security processing-released contents in response to the detected event. According to an embodiment of the present disclosure, a reconstruction-related event which can be detected after the security processing is released is generated, for example, when a predetermined time lapses after the security-processed contents are received, when a connection between the first device 501 and the second device 504 is disconnected or a predetermined time lapses after the disconnection, when a predetermined time lapses after a user is authenticated through the first device 501, or when a user input for releasing user authentication is received. Additional information on various methods in which the second device 504 provides security-processed contents are described below with reference to FIG. 6, 7A to 7C, or 8A to 8C.

In operation 524, the second device 504 makes a request for additional information for releasing security processing to the first device 501 to provide the user with the contents to which the user accesses while the contents are security processing-released. A link through which the request for the additional information in operation 524 is transmitted may be the same as or different from the communication link established in operation 510. According to an embodiment of the present disclosure, when the second device 504 receives the request in operation 522 after the communication link established in operation 510 is released, the second device 504 establishes a new communication link with the first device 501 and transmits a request for additional information through the established communication link. Alternatively, the second device 504 transmits the request for the additional information in message form using an external network (for example, a cellular network or an IP network) of the first device 501 and the second device 504.

In operation 526, the first device 501 performs, for example, user authentication for generating additional information. According to an embodiment of the present disclosure, the first device 501 receives authentication information for user authentication from the user of the first device 501. According to an embodiment of the present disclosure, the first device 501 displays a user interface for receiving authentication information by using a display functionally connected to the first device 501. The first device extracts authentication information from a user input related to the user interface. The authentication information includes, for example, at least one of user finger print information, user iris information, user voice information, user face information, user biometric information, a lock pattern lock, and a password.

According to an embodiment of the present disclosure, the first device 501 authenticates whether the user of the second device 504 has a right to access the contents based on the authentication information acquired from the user of the first device 501. The user of the first device 501 may be the same as or different from the user of the second device 504. According to an embodiment of the present disclosure, even when the user of the first device 501 is different from the user of the second device 504, in order to allow access of the user of the second device 504 through authentication of the user of the first device 501, the first device 501 displays information related to the user of the second device 504 through the interface for receiving the authentication information from the user of the first device 501.

When the authentication is successful in operation 526, the first device 501 generates additional information for releasing the security in the second device 504 in operation 528. According to an embodiment of the present disclosure, the additional information includes, for example, at least one of a decryption key of contents, a message for accepting or rejecting the release of security processing, a term related to the release of security processing, and a number of times access is accepted. According to an embodiment of the present disclosure, when at least some of the security processing applied to the contents correspond to encryption, the first device 501 generates a decryption key of the contents based on at least one of the authentication information acquired in operation 526 and time information related to the time when the additional information is generated in operation 528.

In operation 530, the first device 501 transmits the additional information for releasing the security processing applied to the contents to the second device 504 in response to the additional request in operation 524. A link through which the additional information in operation 530 is transmitted may be the same as or different from the communication link established in operation 510. According to an embodiment of the present disclosure, after the communication link established in operation 510 is released, the second device 504 establishes a new communication link with the first device 501 and transmits an additional information request through the established communication link. Alternatively, the first device 501 transmits the additional information in message form using an external network (for example, a cellular network or an IP network) of the first device 501 and the second device 504.

In operation 532, the second device 504 releases the security processing applied to the corresponding contents based on the additional information received in operation 530.

In operation 534, the second device 504 displays, for a user, expressions corresponding to a state where the security of the contents is released, on a display functionally connected to the second device 504. According to an embodiment of the present disclosure, the expressions corresponding to the state where the security of the contents is released may be equal or similar to expressions related to contents provided by the first device in response to the user access to the corresponding contents in the first device 501.

According to an embodiment of the present disclosure, when the type of security processing corresponds to encryption, the second device 504 displays or reproduces the decrypted contents or displays information related to the decrypted contents. According to an embodiment of the present disclosure, when the type of security processing corresponds to the hiding setting, the second device 504 releases hiding-related attributes of the contents and displays or reproduces the hiding-released contents or displays information related to the hiding-released contents. According to an embodiment of the present disclosure, when the type of security processing corresponds to the notification setting, the second device 504 releases notification-related attributes of the contents to not provide separate notification related to the display or reproduction of the contents to another external device (for example, the first device 501) of the second device 504. According to an embodiment of the present disclosure, with respect to the display or reproduction of the contents, the second device 504 displays a watermark included in the contents, displays a watermark overlapping the contents, or may not reproduce the contents.

Figure 6:
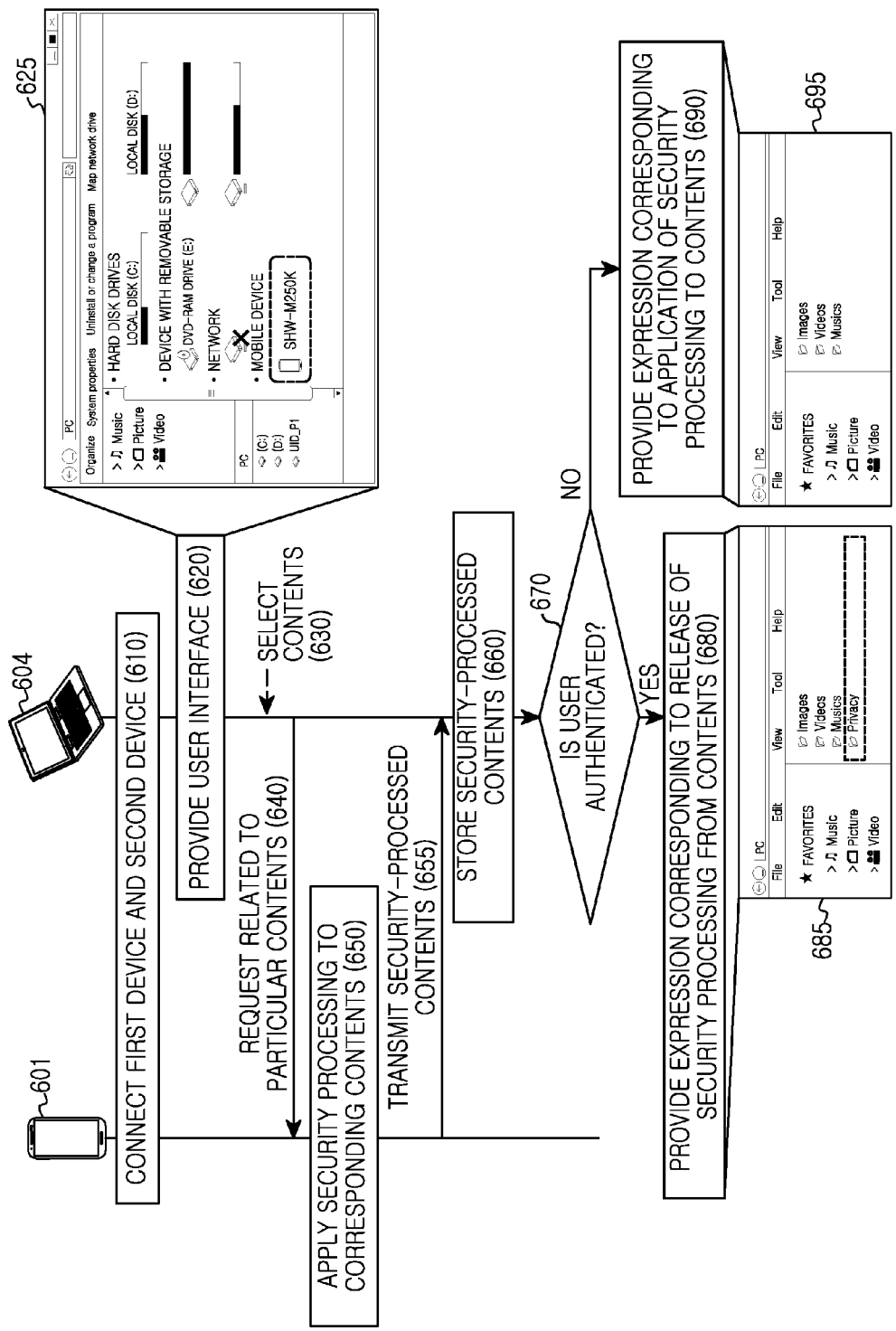
FIG. 6 is a flowchart of a method of providing security-released contents among a plurality of electronic devices according to an embodiment of the present disclosure.

FIG. 6 is a flowchart of a method of providing security-released contents among a plurality of electronic devices according to an embodiment of the present disclosure.

Referring to FIG. 6, the plurality of electronic devices includes a first device 601 (for example, the first electronic device 101) and a second device 604 (for example, the second electronic device 104). Contents shared among the plurality of electronic devices 601, 604 are, for example, contents which are stored in storage (for example, a memory) functionally connected to the first device 601 and stored in a folder having private attributes which are configured not to be displayed on another device (for example, the second device 604) outside the first device 601 without user authentication (for example, fingerprint authentication) through the first device 601.

In operation 610, when the second device 604 and the first device 601 are connected to each other through a wired/wireless interface (for example, a USB), the second device 604 recognizes the first device 601 and establishes a communication link with the first device 601. The second device 604 receives a device driver module corresponding to the first device 601 from an external server of the second device 604 or the storage functionally connected to the second device 604 and installs the received device driver module.

In operation 620, the second device 604 displays contents (or files or applications) stored in the storage functionally connected to the first device 601 through a display functionally connected to the second device 604 and provides a user interface 625 which provides a function of executing, editing, copying, moving, or deleting the displayed contents (or files or applications). According to an embodiment of the present disclosure, with respect to the folder of the private attributes, when user authentication through the first device 601 is successful, the second device 604 displays the folder or the contents (or files or applications) within the folder through the user interface 625 of the second device 604. Otherwise, the second device 604 does not display the folder and the contents (or files or applications) within the folder through the user interface 625 of the second device 604.

According to an embodiment of the present disclosure, when the second device 604 is connected to the first device 601 through a wired/wireless interface (for example, a USB), the second device 604 recognizes the first device 601, receives information related to a folder stored in the first device 601 through a protocol (for example, a Media Transfer Protocol (MTP) specified for transmitting/receiving the contents through a USB connection, and displays the folder of the first device 601. According to an embodiment of the present disclosure, when user authentication through the first device 601 is successful, the second device 604 mounts a volume corresponding to the folder to at least some of the storage functionally connected to the second device 604 in connection with the folder. The second device 604 informs the first device 601 of the generation of an event related to the volume mounted to the second device 604 by using a predetermined protocol. The second device 604 transmits a request related to the volume mounted to the second device 604 to the first device 601 by using instructions (for example, "GetObjectHandles( )" or "GetObjectPropList( )") included in the predetermined protocol, receives information on contents (or filer or applications) within the corresponding volume from the first device 601 in response to the request, and displays the information on the contents (or filer or applications) within the corresponding volume.

In operation 630, the user of the second device 604 selects contents to be shared among the contents displayed through the user interface 625 of the second device 604 (for example, drag or drop the selected contents to an object corresponding to the second device 604).

In operation 640, the second device transmits, for example, a request for transmitting the selected contents to the first device 601.

In operations 650 to 655, the first device 601 transmits contents, which have been security-processed by performing security processing to the contents, corresponding to the transmission request to the second device 604.

In operation 660, the second device 604 stores the security-processed contents in the storage functionally connected to the second device.

In operation 670, the second device 604 determines whether a user is authenticated when providing the corresponding contents.

When the user is successfully authenticated for the corresponding contents, the second device 604 provides the user with expressions 685 corresponding to a state where the security processing is released from the contents in operation 680. When the user fails to be authenticated for the corresponding contents, the second device 604 provides the user with expressions 695 corresponding to a state where the security processing is applied to the contents in operation 680.

According to an embodiment of the present disclosure, as at least some of the expressions 695 corresponding to the state where the security processing is applied to the contents, the second device displays brief information (for example, a file name) on the security-processed contents, but does not execute the corresponding contents even though there is a user input for the display information. Alternatively, the second device hides the information on the security-processed contents from the user's view without displaying.

Figure 7A:
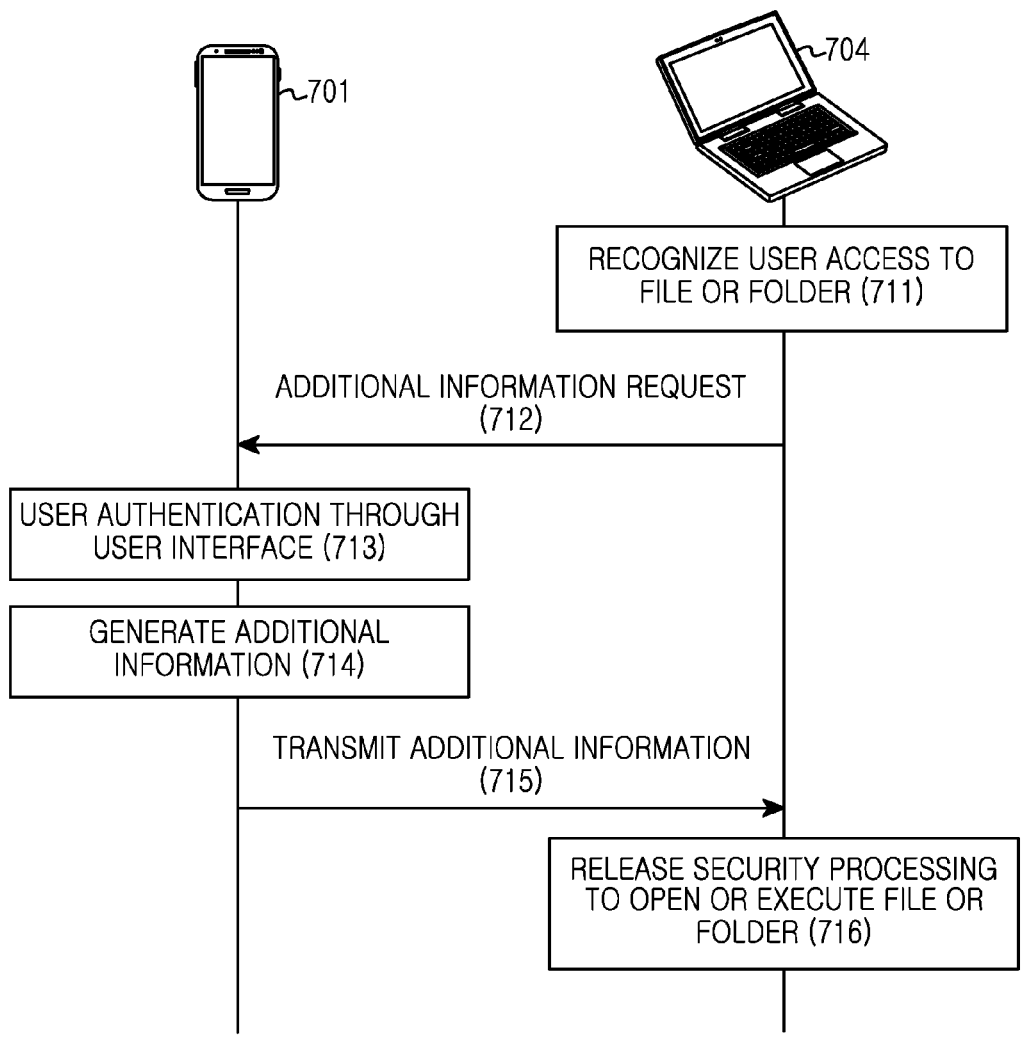
FIGS. 7A to 7C are flowcharts and an illustration of an authentication methods of releasing security processing according to an embodiment of the present disclosure.
Figure 7B:
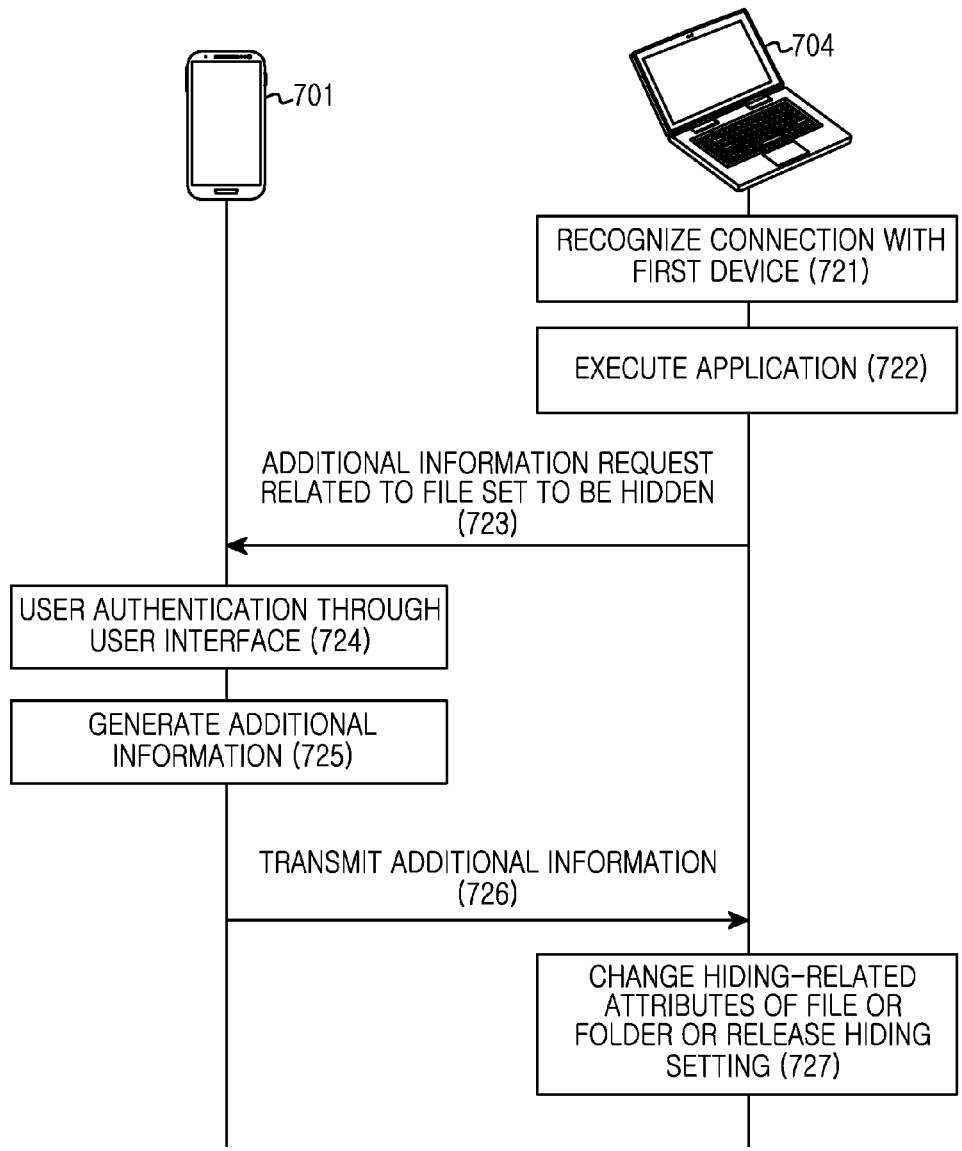
Figure 7C:
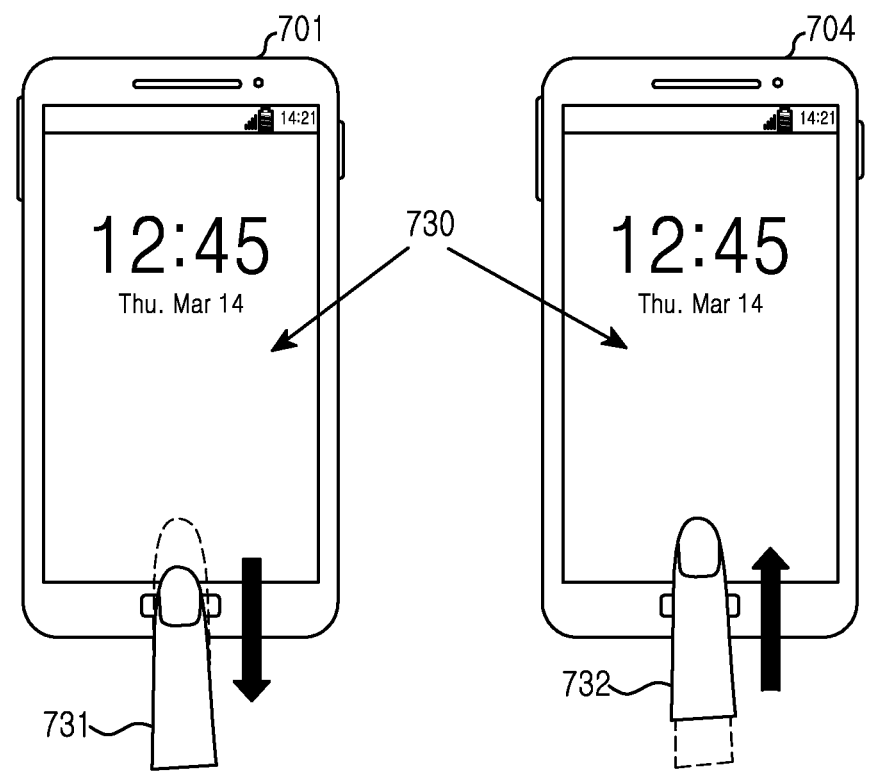

FIGS. 7A to 7C are flowcharts and an illustration of authentication methods of for releasing security processing according to an embodiment of the present disclosure.

Referring to FIG. 7A, a second device 704 (for example, the second electronic device 104) provides a user interface for sharing files (contents) of a first device 701 (for example, the first electronic device 101), and recognizes user access to the files (e.g. contents) or a folder of the first device 701 (select the displayed file or folder) through the provided user interface in operation 711.

In operation 712, the second device 704 makes a request for additional information (for example, a key) for releasing (for example, decrypting) security processing (for example, encryption) applied to the files or folder corresponding to the user access to the first device 701 in response to the recognized user access.

In operation 713, the first device 701 provides (e.g., a pop up) a user interface (for example, a fingerprint input interface) for user authentication, recognizes authentication information (for example, fingerprint information) of the user through the provided user interface, and performs the user authentication based on the recognized authentication information.

When the user authentication is successful in operation 713, the first device 701 generates additional information (for example, a key) for releasing security processing in operation 714.

In operation 715, the first device 701 transmits the additional information (for example, the key) generated in operation 714 to the second device 704.

In 716, the second device 704 releases (for example, decrypt) security processing (for example, encryption) applied to the files or folder based on the additional information (for example, the key) received in operation 715, and opens or executes the files or folder.

Referring to FIG. 7B, in operation 721, the second device 704 recognizes a wired wireless interface (for example, a USB) connection with the first device 701.

In operation 722, the second device 704 automatically executes an application for accessing the recognized files or folder of the first device 701. According to an embodiment of the present disclosure, the second device 704 acquires information (for example, attributes) related to the files or folder of the first device 701 from the first device 701 according to, for example, execution of the application.

In operation 723, the second device 704 transmits a request for additional information (for example, a key) for releasing a hiding setting of a files or folder which is set to be hidden among the files or folder of the first device 701 to the first device 701.

In operation 724, the first device 701 provides (e.g. a pop up) a user interface (for example, a fingerprint input interface) for user authentication, recognizes authentication information (for example, fingerprint information) of the user through the provided user interface, and performs the user authentication based on the recognized authentication information. When the user authentication is successful in operation 725, the first device 701 generates additional information (for example, a key) for releasing security processing in operation 724.

In operation 726, the first device 701 transmits the additional information (for example, the key) generated in operation 725 to the second device 704.

In operation 727, the second device 704 releases the hiding setting of the file or folder by using the additional information (for example, the key) received in operation 726. According to an embodiment of the present disclosure, the second device 704 changes hiding-related attributes of the file or folder from "hidden" to "visible."

Referring to FIG. 7C, the first device 701 provides (for example, a pop up) a user interface 730 (for example, a fingerprint input interface) for performing user authentication through a display functionally connected to the first device 701 according to an additional information request for releasing security of the second device 704.

According to an embodiment of the present disclosure, the first device 701 receives a determination related to the security processing applied to the contents (for example, whether to release the security processing applied to the contents or whether to change hiding-related attributes of the contents) as well as user authentication information (for example, fingerprint information) as at least some of the user input for the user interface 730. According to an embodiment of the present disclosure, like a first user input 731, the user may input a fingerprint of a finger while moving the corresponding finger in a predetermined direction (for example, upwards) in a fingerprint input portion of the user interface 730. The first user input 731 may be an instruction to release the security processing applied to the contents when the fingerprint authentication is successful. According to an embodiment of the present disclosure, like a second user input 732, the user may input a fingerprint of a finger while moving the corresponding finger in a direction (for example, downwards) different from that of the first user input in the fingerprint input portion of the user interface 730. The second user input 732 may be an instruction to maintain the security processing applied to the contents when the fingerprint authentication is successful. The first device 701 may reject, for example, the request for additional information from the second device based on the second user input 732.

Figure 8A:
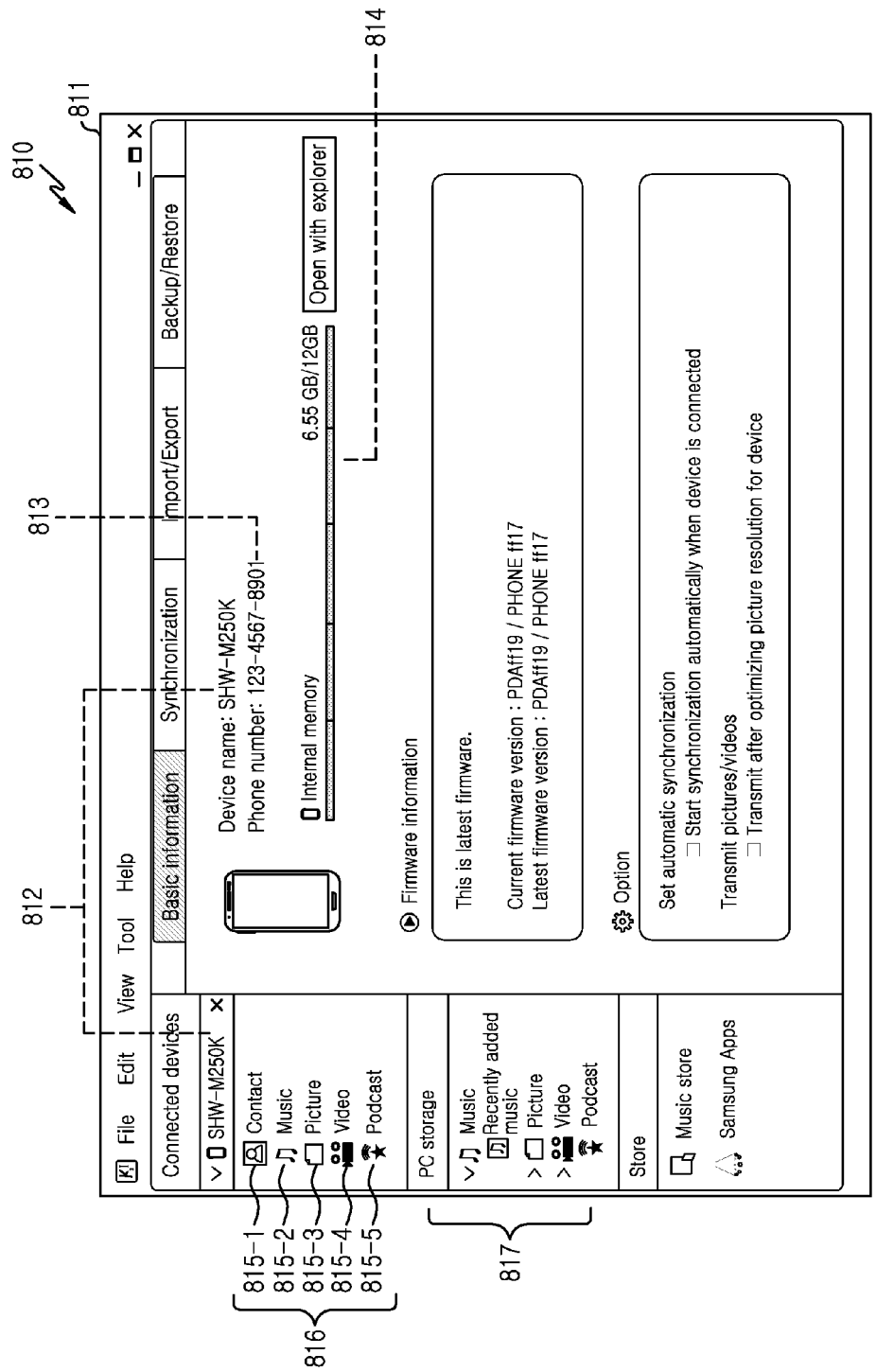
FIGS. 8A to 8C illustrate interface screens for sharing contents among a plurality of electronic devices according to an embodiment of the present disclosure.
Figure 8B:
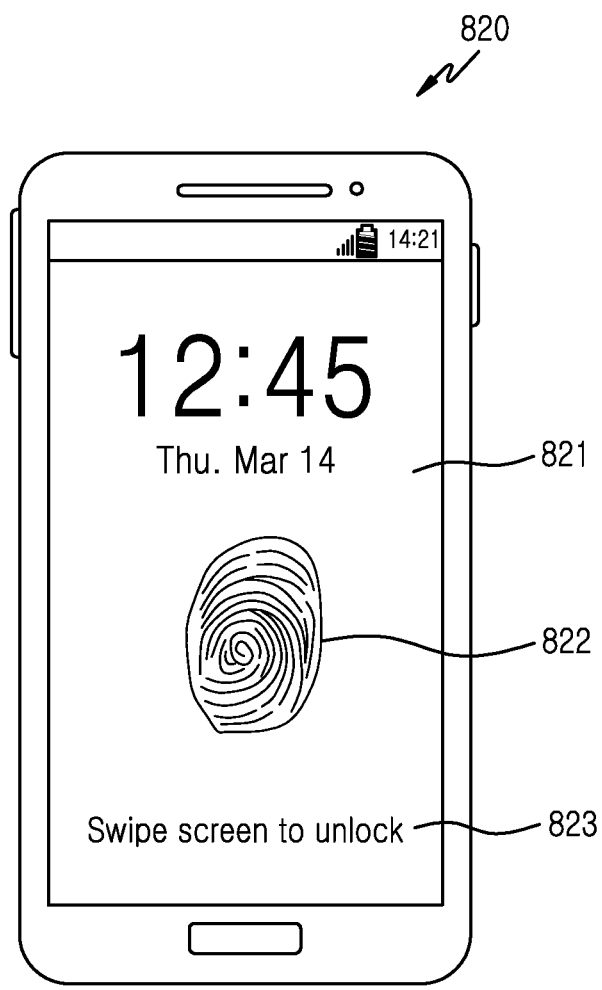
Figure 8C:
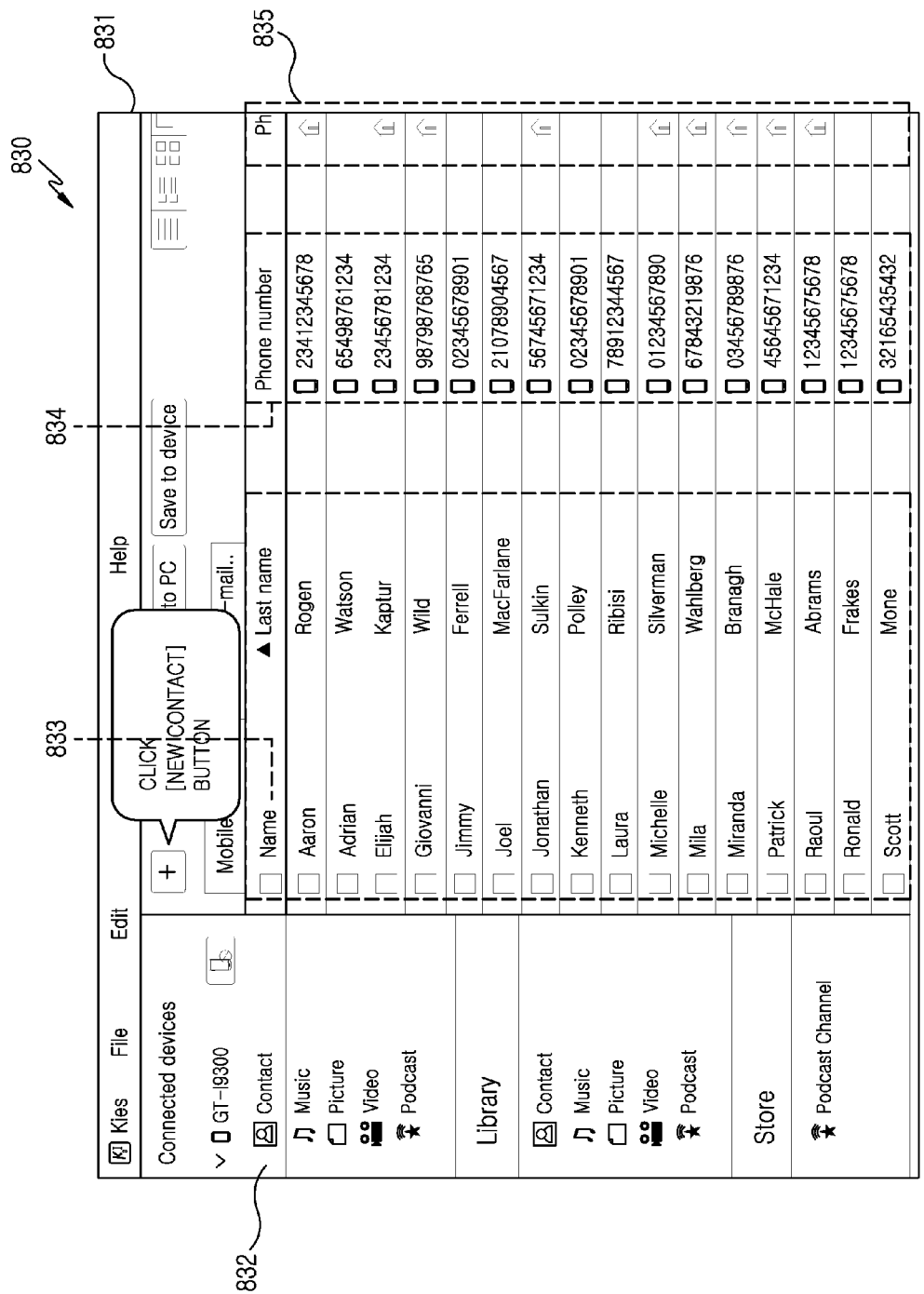

FIGS. 8A to 8C illustrate interface screens for sharing contents among a plurality of electronic devices according to an embodiment of the present disclosure.

Referring to FIG. 8A, a screen 810 may be a user interface 811 provided by the second device when a connection between the first device and the second device is established.

The user interface 811 of the second device displays, for example, information on the first device connected to the second device (for example, a device name 812, an identification number (for example, a phone number 813), a storage capacity 814, or connection information between the first device and the second device, and also display contents which can be shared among the contents stored in the first device. According to an embodiment of the present disclosure, the user interface 811 of the second device displays content items which can be shared, for example, contacts 815-1, music 815-2, pictures 815-3, videos 815-4, or podcast 815-5 as illustrated in the screen 810.

According to an embodiment of the present disclosure, the second device recognizes a user's selection input (for example, a click) for the displayed contents. When the contents corresponding to the selection input are security-processed contents or attributes of the corresponding contents are configured to require releasing the security processing when the contents are displayed or executed through the second device, the second device makes a request far user authentication through the first device. According to an embodiment of the present disclosure, content items configured to require releasing the security processing among content items which can be shared may be contacts and pictures, and other content items may be added or the content items may be changed according to a user's setting.

According to an embodiment of the present disclosure, the user interface 811 of the second device includes a menu 817 for displaying contents stored in the second device or an object related to the second device as well as a menu 816 for displaying (sharing) contents stored in the first device.

Referring to FIG. 8B, a screen 820 may be a user interface 821 provided by the first device when a request for user authentication through the first device is received from the second device.

The user interface 821 of the first device displays (for example, a pop up) an image of a finger shape in an area 822 in which a fingerprint input can be recognized. A fingerprint sensor for recognizing a fingerprint input is located in the area in which the fingerprint input can be recognized. Alternatively, the first device transmits a notification message 823 for instructing input of a fingerprint to a user through various methods (for example, display, sound, or vibration).

According to an embodiment of the present disclosure, the first device performs user authentication based on the fingerprint input through the area 822 in which the fingerprint input can be recognized. According to an embodiment of the present disclosure, when a similarity between input fingerprint information and fingerprint information pre-stored in connection with the corresponding user is greater than or equal to a predetermined value, the first device authenticates the user corresponding to the input fingerprint information as a user who has a proper right to access the corresponding contents. According to an embodiment of the present disclosure, the first device determines the similarity by comparing a feature point of the input fingerprint information and the fingerprint information pre-stored in connection with the corresponding user. The first device performs user authentication by applying various fingerprint authentication algorithms and also performs user authentication based on biometric information such as iris, voice, and face as well as fingerprint. Further, the user authentication may be performed based on a different type of authentication information such as a lock pattern or password as well as biometric information.

Referring to FIG. 8C, a screen 830 may be a user interface 831 displaying contents which can be provided after security processing thereof is released in the second device when user authentication through the first device is successful.

When a content item selected by the user is a contact 832, the user interface 831 of the first device displays information related to the contact (for example, a name 833, a phone number 834, and the type 835 of phone number (for example, home, of or mobile phone)), and provides a function of adding a new contact or selecting a particular contact to make a phone call.

According to an embodiment of the present disclosure, when user authentication through the first device fails, the first device rejects a request for releasing security, a predetermined time passes after user authentication through the first device is successful, a connection between the first device and the second device is disconnected, or the first device enters a non-authenticated state, the second device displays the same screen as the screen 810 of FIG. 8A, or displays a notification message indicating that user authentication fails or user authentication is released in such a manner that the notification message overlaps at least a part of the screen 810 of FIG. 8A.

Figure 9:
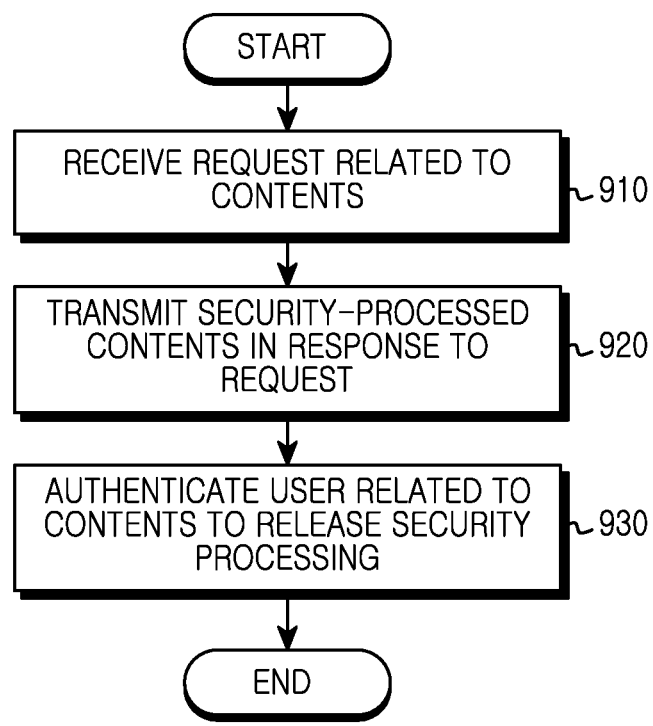
FIG. 9 is a flowchart illustrating a method of sharing contents stored in an electronic device with another device according to an embodiment of the present disclosure.

FIG. 9 is a flowchart illustrating a method of sharing contents stored in an electronic device with another device according to an embodiment of the present disclosure.

In operation 910, an electronic device for example, the first electronic device 101) receives a request related to contents stored in the electronic device (for example, the electronic device 101) from another device (for example, the second electronic device 104) located external to the electronic device.

In operation 920, the electronic device (for example, the first electronic device 101) transmits contents to which security processing has been applied to the other device (for example, the second electronic device 104) in response to operation 910. The security processing of the contents may be performed before or after the electronic device (for example, the first electronic device 101) receives the request of operation 910. Alternatively, the contents to which security processing has been applied may be received from an external server and then stored.

In operation 930, the electronic device (for example, the first electronic device 101) performs user authentication related to the contents in order to release the security processing applied to the contents.

Figure 10:
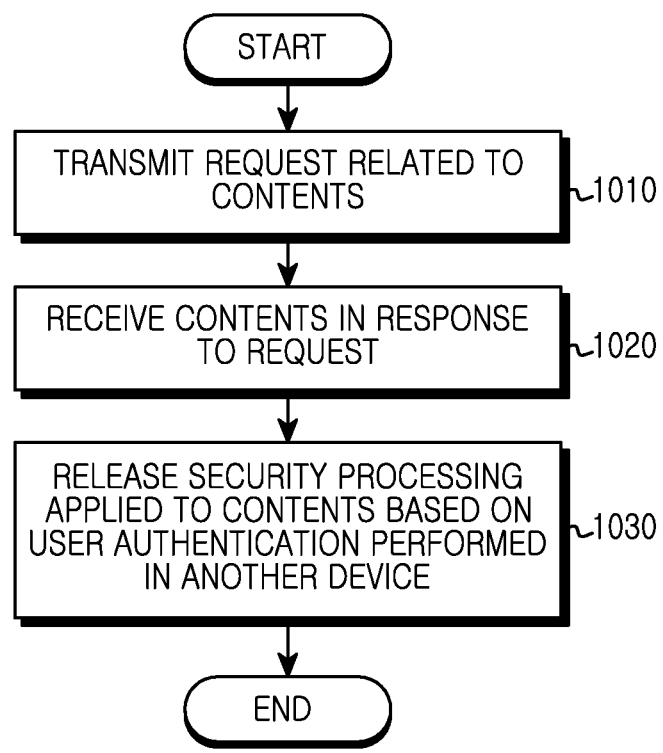
FIG. 10 is a flowchart illustrating a method in which an electronic device shares contents stored in another device according to an embodiment of the present disclosure.

FIG. 10 is a flowchart illustrating a method in which an electronic device shares contents stored in another device according to an embodiment of the present disclosure.

In operation 1010, an electronic device (for example, the second electronic device 104) transmits a request related to contents stored in another device (for example, the first electronic device 101) located external to the electronic device to the other device.

In operation 1020, the second electronic device 104 receives contents to which security processing has been applied, from the first electronic device 101 in response to the request of operation 1010.

In operation 1030, the second electronic device 104 releases the security processing applied to the corresponding contents based on user authentication related to the contents which is performed in the first electronic device 101.

The operations (for example, operations 910 to 930 or operations 1010 to 1030) described in the processes and methods illustrated in FIGS. 9 to 10 may be performed in a sequential, parallel, repetitive, or heuristic method. Furthermore, the operations may be performed in a different order, some of the operations may be omitted, or other operations may be added.

According to an embodiment of the present disclosure, a method of sharing contents may include receiving a request signal related to contents stored in a first device from a second device communicatively coupled to the first device, by the first device; transmitting the contents to the second device in response to the request, by the first device, wherein the contents are security applied contents; and authenticating a user related to the contents in order to release the security, by the first device.

According to an embodiment of the present disclosure, the second device may be connected to the first device through a wired or wireless communication scheme.

According to an embodiment of the present disclosure, the method may further include determining whether to perform security processing on the contents based on attributes of the contents; and performing the security processing to the contents based on the determination.

According to an embodiment of the present disclosure, the attributes of the contents may be determined based on information recorded in a header of the contents or attributes of a higher group including the contents.

According to an embodiment of the present disclosure, performing the security processing may include generating an encryption key related to the contents and encrypting the contents based on the encryption key.

According to an embodiment of the present disclosure, generating the encryption key may be performed based on at least one of user fingerprint information, user iris information, user voice information, user face information, user biometric information, a lock pattern, a password, and time information related to a time when the encryption key is generated.

According to an embodiment of the present disclosure, performing the security processing may include setting hiding-related attributes of the contents such that the contents are hidden from view of a user of the second device as at least some of the security processing.

According to an embodiment of the present disclosure, performing the security processing may include adding information related to a right to access the contents to the contents as at least some of the security processing.

According to an embodiment of the present disclosure, performing the security processing may include setting notification-related attributes of the contents such that notification of user access to the contents is transmitted to the first device as at least some of the security processing.

According to an embodiment of the present disclosure, performing the security processing may include inserting a watermark related to the contents to the contents.

According to an embodiment of the present disclosure, authenticating the user may include receiving an additional request signal for additional information for releasing the security processing from the second device, by the first device; receiving authentication information from the user in response to the additional request, by the first device; authenticating whether the user is a user who has a right to access the contents based on the authentication information, by the first device; when the authentication is successful, generating the additional information, by the first device; and transmitting the additional information to the second device in response to the request for the additional information, by the first device.

According to an embodiment of the present disclosure, receiving the authentication information may include: displaying a user interface for receiving the authentication information by using a display functionally connected to the first device; and extracting the authentication information from a user input related to the user interface.

According to an embodiment of the present disclosure, the authentication information may include at least one of user fingerprint information, user iris information, user voice information, user face information, user biometric information, a lock pattern lock, and a password.

According to an embodiment of the present disclosure, the additional information may include at least one of a decryption key of the contents, a message for accepting or rejecting release of the security, a term related to the release of the security, and the number of times by which access is accepted.

According to an embodiment of the present disclosure, generating the additional information may include generating, as at least some of the additional information, a decryption key of the contents based on at least one piece of authentication information and time information related to a time when the additional information is generated.

According to an embodiment of the present disclosure, receiving the additional request signal may include using at least one of a short-range communication connection between the first device and the second device and an external network of the first device and the second device.

According to an embodiment of the present disclosure, transmitting the additional information may include using at least one of a short-range communication connection between the first device and the second device and an external network of the first device and the second device.

According to an embodiment of the present disclosure, a method of sharing contents may include transmitting a request signal related to contents stored in a first device to the first device communicatively coupled to a second device, by the second device; receiving the contents from the first device in response to the request, by the second device; and releasing security applied to the contents based on user authentication related to the contents, which is performed in the first device, by the second device.

According to an embodiment of the present disclosure, the first device may be connected to the second device through a wired or wireless communication scheme.

According to an embodiment of the present disclosure, releasing security may include acquiring user information related to the contents from the contents, by the second device; determining whether the user has a right to access the contents based on the user information, by the second device; and releasing the security based on the determination, by the second device.

According to an embodiment of the present disclosure, releasing the security may include displaying, for a user, an expression corresponding to a state where the security is released through a display functionally connected to the second device.

According to an embodiment of the present disclosure, the method may farther include displaying, for a user, a first expression corresponding to a state where the security is not released through a display functionally connected to the second device, and the first expression corresponding to the state where the security is not released is different from a second expression corresponding to a state where the security is released.

According to an embodiment of the present disclosure, displaying the first expression may include hiding the contents in which the security is not released, from a view of a user of the second device.

According to an embodiment of the present disclosure, displaying the first expression may include transmitting a message related to the contents to the first device in response to user access to the contents.

According to an embodiment of the present disclosure, displaying the first expression may include acquiring a watermark related to the contents from the contents; and displaying the watermark as at least some of the first expression or to overlap at least some of the first expression.

According to an embodiment of the present disclosure, releasing the security may include making a request for authenticating a user related to the contents to the first device, by the second device; receiving additional information for releasing the security from the first device in response to the request, by the second device; and releasing the security based on at least the additional information, by the second device.

According to an embodiment of the present disclosure, the additional information may include at least one of a decryption key of the contents, a message for accepting or rejecting release of the security, a term related to the release of the security, and the number of times by which access is accepted.

According to an embodiment of the present disclosure, releasing the security may include detecting a specific event generated in the second device; and reconstructing the security in the contents in which the security is released in response to the event.

Figure 11:
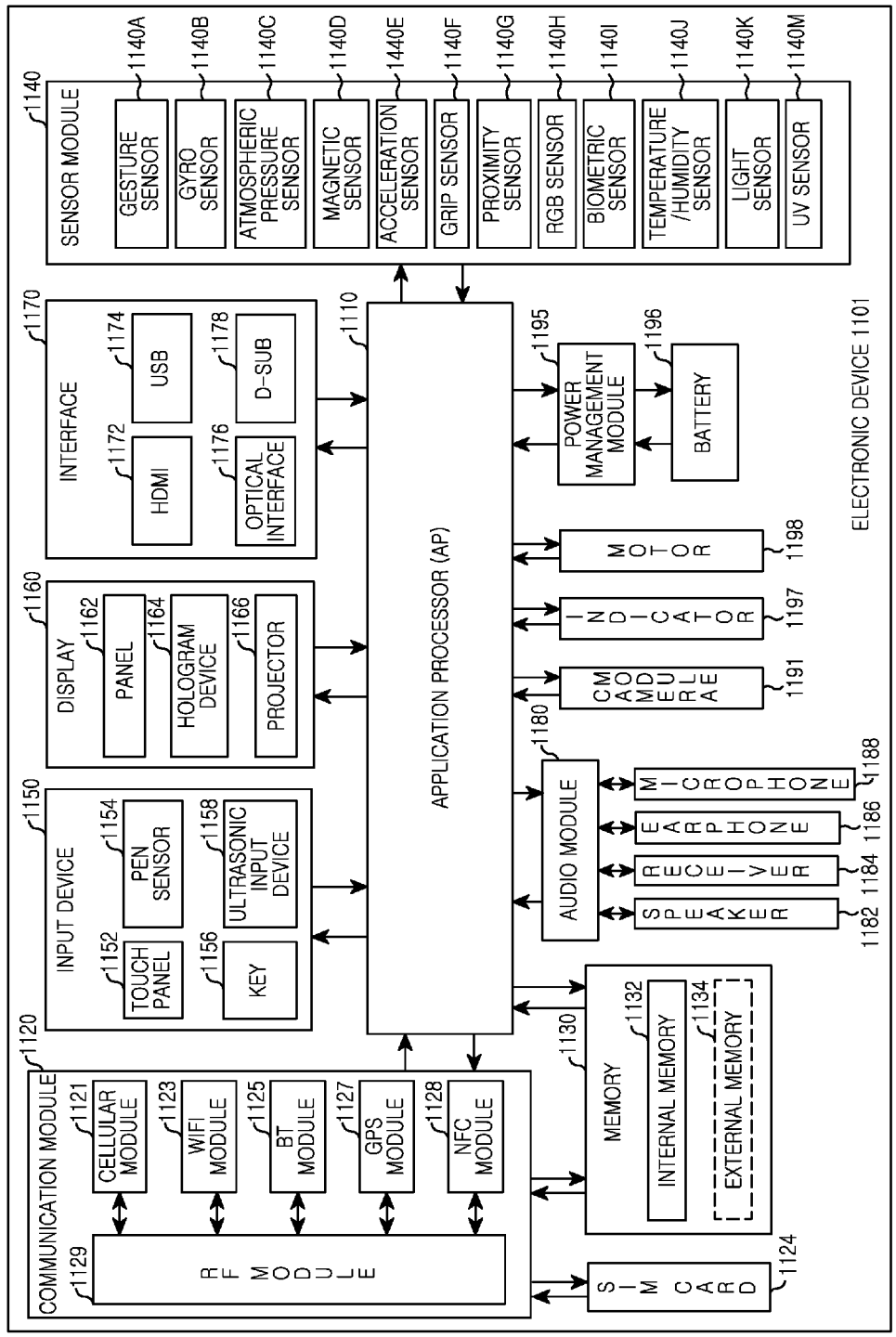
FIG. 11 is a block diagram of an electronic device according to an embodiment of the present disclosure.

FIG. 11 is a block diagram 1100 of an electronic device 1101 according to an embodiment of the present disclosure. The electronic device 1101 may include, for example, all or some of the electronic device 201 illustrated in FIG. 2.

Referring to FIG. 11, the electronic device 1101 may include at least one Application Processor (AP) 1110, a communication module 1120, a Subscriber Identification Module (SIM) card 1124, a memory 1130, a sensor module 1140, an input device 1150, a display 1160, an interface 1170, an audio module 1180, a camera module 1191, a power management module 1195, a battery 1196, an indicator 1197, and a motor 1198.

The AP 1110 controls a plurality of hardware or software components connected to the AP 1110 by driving an operating system or an application program and performs processing of various pieces of data including multimedia data and calculations. The AP 1110 may be implemented by, for example, a System on Chip (SoC). According to an embodiment of the present disclosure, the AP 1110 may further include a Graphics Processing Unit (GPU).

The communication module 1120 (for example, the communication interface 160) performs data transmission/reception in communication between the electronic device 1101 (for example, the electronic device 101) and other electronic devices (for example, the electronic device 104 or the server 106) connected thereto through a network. According to an embodiment of the present disclosure, the communication module 1120 may include a cellular module 1121, a Wi-Fi module 1123, a BT module 1125, a OPS module 1127, an NFC module 1128, and a Radio Frequency (RF) module 1129.

The cellular module 1121 may provide a voice call, a video call, a Short Message Service (SMS), or an Internet service through a communication network (for example, LTE, LTE-A, CDMA, WCDMA, UMTS, WiBro, or GSM). Furthermore, the cellular module 1121 may distinguish between and authenticate electronic devices within a communication network by using, for example, a Subscriber Identification Module (for example, the SIM card 1124). According to an embodiment of the present disclosure, the cellular module 1121 performs at least some functions which the AP 1110 provides. For example, the cellular module 1121 may perform at least some of the multimedia control functions.

According to an embodiment of the present disclosure, the cellular module 1121 may include a Communication Processor (CP). Furthermore, the cellular module 1121 may be implemented by, for example, an SoC. Although the components such as the cellular module 1121 (for example, a communication processor), the memory 1130, and the power management module 1195 are illustrated to be separate from the AP 1110 in FIG. 11, the AP 1110 may include at least some of the aforementioned components (for example, the cellular module 1121) in an embodiment of the present disclosure.

According to an embodiment of the present disclosure, the AP 1110 or the cellular module 1121 (for example, the communication processor) loads a command or data received from at least one of a non-volatile memory and other components connected thereto in a volatile memory, and processes the loaded command or data. Furthermore, the AP 1110 or the cellular module 1121 stores data received from or generated by at least one of other components in a non-volatile memory.

Each of the Wi-Fi module 1123, the BT module 1125, the GPS module 1127, and the NFC module 1128 may include, for example, a processor for processing data transmitted/received through the corresponding module. Although the cellular module 1121, the WiFi module 1123, the BT module 1125, the GPS module 1127, and the NFC module 1128 are illustrated as separate blocks in FIG. 11, at least some (for example, two or more) of the cellular module 1121, the Win module 1123, the ET module 1125, the GPS module 1127, and the NFC module 1128 may be included in one Integrated Circuit (IC) or one IC package in an embodiment of the present disclosure. For example, at least some (for example, the communication processor corresponding to the cellular module 1121 and the WiFi processor corresponding to the Win module 1123) of the processors corresponding to the cellular module 1121, the WiFi module 1123, the BT module 1125, the GPS module 1127, and the NFC module 1128 may be implemented as one SoC.

The RF module 1129 may transmit/receive data, for example, an RF signal. The RF module 1129 may include, for example, a transceiver, a Power Amplifier Module (PAM), a frequency filter, a Low Noise Amplifier (LNA) or the like. Further, the RF module 1129 may further include a component for transmitting/receiving electronic waves over the air in a wireless communication, for example, a conductor, a conductive wire or the like. Although the cellular module 1121, the Wi-Fi module 1123, the BT module 1125, the OPS module 1127, and the NFC module 1128 share one RF module 1129 in FIG. 11, at least one of the cellular module 1121, the Wi-Fi module 1123, the BT module 1125, the GPS module 1127, and the NFC module 1128 may transmit/receive an RF signal through a separate RF module in an embodiment of the present disclosure.

The SIM card 1124 may be inserted into a slot formed in a certain portion of the electronic device. The SIM card 1124 may include unique identification information (for example, an Integrated Circuit Card IDentifier (ICCID)) or subscriber information (for example, an International Mobile Subscriber entity (IMSI)).

The memory 1130 (for example, the memory 130) may include an internal memory 1132 or an external memory 1134. The internal memory 1132 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EE-PROM), a mask ROM, a flash ROM, a NAND flash memory, a NOR flash memory, and the like).

According to an embodiment of the present disclosure, the internal memory 1132 may be a Solid State Drive (SSD). The external memory 1134 may further include a flash drive, for example, a Compact Flash (CF) drive, a Secure Digital (SD) memory card, a Micro Secure Digital (Micro-SD) memory card, a Mini Secure Digital (Mini-SD) memory card, an extreme Digital (xD) memory card, a memory stick, or the like. The external memory 1134 may be functionally connected with the electronic device 1101 through various interfaces. According to an embodiment of the present disclosure, the electronic device 1101 may further include a storage device (or a storage medium) such as a hard disk drive.

The sensor module 1140 measures a physical quantity or detects an operation state of the electronic device 1101, and converts the measured or detected information to an electrical signal. The sensor module 1140 may include, for example, at least one of a gesture sensor 1140A, a gyro sensor 1140B, an atmospheric pressure sensor 1140C, a magnetic sensor 1140D, an acceleration sensor 1140E, a grip sensor 1140F, a proximity sensor 1140G, a color sensor 1140H (for example, a Red, Green, and Blue (RGB) sensor), a biometric sensor 1140I, a temperature/humidity sensor 1140J, a light sensor 1140K, and a Ultra Violet (UV) light sensor 1140M. Additionally or alternatively, the sensor module 1140 may include, for example, an Electronic nose (E-nose) sensor, an ElectroMyoGraphy (EMG) sensor, an ElectroEricephaloGram (EEG) sensor, an ElectroCardioGram (ECG) sensor, an InfraRed (IR) sensor, an iris sensor, and a fingerprint sensor. The sensor module 1140 may further include a control circuit for controlling one or more sensors included in the sensor module 1140.

The input device 1150 may include a touch panel 1152, a (digital) pen sensor 1154, a key 1156, or an ultrasonic input device 1158. The touch panel 1152 recognizes a touch input through at least one of, for example, a capacitive type panel, a resistive type panel, an infrared type panel, and an ultrasonic type panel. The touch panel 1152 may further include a control circuit. The capacitive type touch panel recognizes physical contact or a proximity of a contact. The touch panel 1152 may further include a tactile layer. In this case, the touch panel 1152 provides a tactile reaction to the user.

The (digital) pen sensor 1154 may be implemented, for example, using the same or similar method of receiving a user's touch input or using a separate recognition sheet. The key 1156 may include, for example, a physical button, an optical key, or a keypad. The ultrasonic input device 1158 identifies data by detecting an acoustic wave with a microphone (for example, a microphone 1188) of the electronic device 1101 through an input unit generating an ultrasonic signal, and performs wireless recognition. According to an embodiment of the present disclosure, the electronic device 1101 may receive a user input from an external device (for example, a computer or server) connected thereto using the communication module 1120.

The display 1160 (for example, the display 250) may include a panel 1162, a hologram device 1164, or a projector 1166. The panel 1162 may be, for example, a Liquid Crystal Display (LCD) or an Active Matrix Organic Light Emitting Diode (AM-OLED) display. The panel 1162 may be implemented to be, for example, flexible, transparent, or wearable. The panel 1162 may be configured as one module together with the touch panel 1152. The hologram device 1164 shows a stereoscopic image in the air using the interference of light. The projector 1166 projects light onto a screen to display an image. The screen may be located, for example, internal or external to the electronic device 1101. According to an embodiment of the present disclosure, the display 1160 may further include a control circuit for controlling the panel 1162, the hologram device 1164, or the projector 1166.

The interface 1170 may include, for example, a High-Definition Multimedia Interface (HDMI) 1172, a Universal Serial Bus (USB) 1174, an optical interface 1176, or a D-subminiature (D-sub) connector 1178. The interface 1170 may be included in, for example, the communication interface 260 illustrated in FIG. 2. Additionally or alternatively, the interface 1170 may include, for example, a Mobile High-definition Link (MHL) interface, a Secure Digital (SD) card/Multi-Media Card (MMC) interface, or an Infrared Data Association (IrDA) standard interface.

The audio module 1180 bilaterally converts a sound and an electrical signal. At least some components of the audio module 1180 may be included in, for example, the input/output interface 240 illustrated in FIG. 2. The audio module 1180 processes sound information input or output through, for example, a speaker 1182, a receiver 1184, an earphone 1186, the microphone 1188, or the like.

The camera module 1191 is a device for capturing a still image or a video, and according to an embodiment of the present disclosure, may include one or more image sensors (for example, a front image sensor or a rear image sensor), a lens, an Image Signal Processor (ISP), or a flash (for example, a Light Emitting Diode (LED) flash or a xenon lamp).

The power management module 1195 manages power of the electronic device 1101. The power management module 1195 may include, for example, a Power Management Integrated Circuit (PMIC), a charger Integrated Circuit (IC), or a battery gauge.

The PMIC may be mounted in, for example, an integrated circuit or an SoC semiconductor. Charging methods may be classified into a wired charging method and a wireless charging method. The charger IC may charge a battery, and may prevent introduction of over-voltage or over-current from a charger. According to an embodiment of the present disclosure, the charger IC may include a charger IC for at least one of the wired charging method and the wireless charging method. Examples of the wireless charging method may include a magnetic resonance type, a magnetic induction type, or an electromagnetic wave type, and an additional circuit for wireless charging, such as a coil loop circuit, a resonance circuit, or a rectifier circuit may be added.

The battery gauge measures, for example, a remaining quantity of the battery 1196, or a voltage, a current, or a temperature during the charging. The battery 1196 stores or generates electrical power, and supplies electrical power to the electronic device 1101 using the stored or generated electrical power. The battery 1196 may include, for example, a rechargeable battery or a solar battery.

The indicator 1197 displays a certain status of the electronic device 1101 or a part (for example, the AP 1110) of the electronic device 1101, for example, a booting status, a message status, a charging status, and the like. The motor 1198 converts an electrical signal into a mechanical vibration. The electronic device 1101 may include a processing unit (for example, a GPU) for supporting mobile TV. The processing unit for supporting mobile TV may process media data according to a standard of Digital Multimedia Broadcasting (DMB), Digital Video Broadcasting (DVB), media flow or the like.

The aforementioned elements of the electronic device according to various embodiments of the present disclosure may be constituted by one or more components, and the name of the corresponding element may vary with a type of electronic device. The electronic device according to various embodiments of the present disclosure may be formed to include at least one of the above described components, and some of the components may be omitted or additional components may be further included. Further, some of the components of the electronic device according to the various embodiments of the present disclosure may be combined to form a single entity, and thus, may equivalently execute functions of the corresponding elements prior to the combination.

Figure 12:
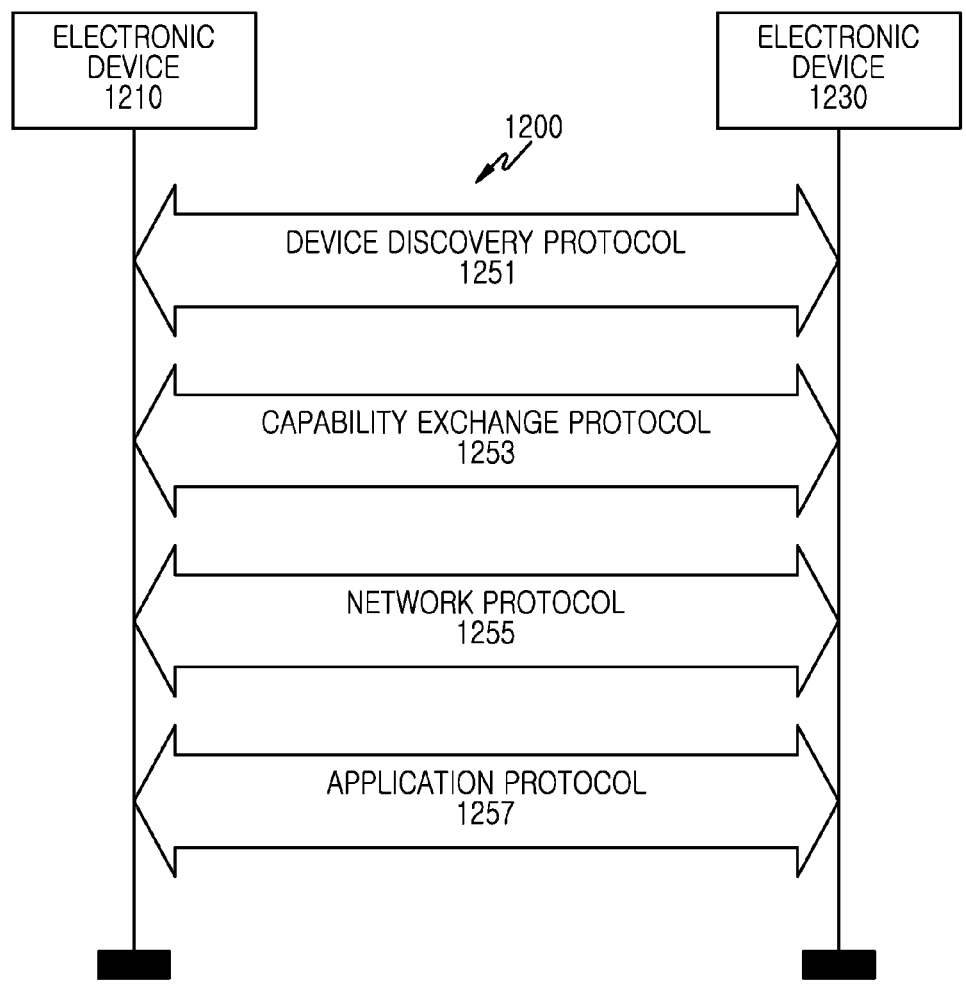
FIG. 12 illustrates communication protocols among a plurality of electronic devices according to an embodiment of the present disclosure.

FIG. 12 illustrates a communication protocol 1200 among a plurality of electronic devices (for example, an electronic device 1210 and an electronic device 1230) according to an embodiment of the present disclosure.

Referring to FIG. 12, the communication protocol 1200 may include, for example, a device discovery protocol 1251, a capability exchange protocol 1253, a network protocol 1255, and an application protocol 1257.

According to an embodiment of the present disclosure, the device discovery protocol 1251 may be a protocol that allows the electronic devices (for example, the electronic device 1210 or the electronic device 1230) to detect an external electronic device which can communicate with the electronic devices or to be connected to the detected external electronic device. For example, the electronic device 1210 (for example, the electronic device 201) may detect the electronic device 1230 (for example, the electronic device 204) as a device which can communicate with the electronic device 1210 through a communication method (for example, WiFi, BT, USB or the like) which can be used by the electronic device 1210 by using the device discovery protocol 1251. For communication with the electronic device 1230, the electronic device 1210 may acquire and store identification information on the detected electronic device 1230 using the device discovery protocol 1251. For example, the electronic device 1210 may establish the communication with the electronic device 1230, based on the identification information.

According to an embodiment of the present disclosure, the device discovery protocol 1251 may be a protocol for mutual authentication between a plurality of electronic devices. For example, the electronic device 1210 may perform an authentication between the electronic device 1210 and the electronic device 1230 based on communication information (for example, a Media Access Control (MAC) address, a Universally Unique IDentifier (UUID), a SubSystem IDentification (SSID), and an Information Provider (IP) address) for the connection with the electronic device 1230.

According to an embodiment of the present disclosure, the capability exchange protocol 1253 may be a protocol for exchanging information related to a service function which can be supported by at least one of the electronic device 1210 and the electronic device 1230. For example, the electronic device 1210 and the electronic device 1230 may mutually exchange information related to currently provided service functions through the capability exchange protocol 1253. The exchangeable information may include identification information indicating a particular service among a plurality of services which can be supported by the electronic device 1210 or the electronic device 1230. For example, the electronic device 1210 may receive, from the electronic device 1230, identification information of a particular service provided by the electronic device 1230 through the capability exchange protocol 1253. In this case, the electronic device 1210 may determine whether the electronic device 1210 can support the particular service based on the received identification information.

According to an embodiment of the present disclosure, the network protocol 1255 may be a protocol for controlling flows of data which are transmitted/received to provide a service linked between the electronic devices (for example, the electronic device 1210 and the electronic device 1230) which are connected to communicate with each other. For example, at least one of the electronic device 1210 and the electronic device 1230 may control an error or data quality using the network protocol 1255. Additionally or alternatively, the network protocol 1255 may determine a transmission format of data transmitted/received between the electronic device 1210 and the electronic device 1230. Further, at least one of the electronic device 1210 and the electronic device 1230 may at least manage a session (for example, connect or terminate a session) for a data exchange between the electronic devices by using the network protocol 1255.

According to an embodiment of the present disclosure, the application protocol 1257 may be a protocol for providing a procedure or information for exchanging data related to a service provided to an external electronic device. For example, the electronic device 1210 (for example, the electronic device 201) may provide a service to the electronic device 1230 (for example, the electronic device 204 or the server 206) through the application protocol 1257.

According to an embodiment of the present disclosure, the communication protocol 1200 may include a standard communication protocol, a communication protocol designated by an individual or organization (for example, a communication protocol self-designated by a communication device manufacturing company or a network supplying company) or a combination thereof.

The term "module" used in various embodiments of the present disclosure may refer to, for example, a "units" including one of hardware, software, and firmware, or a combination of two or more of the hardware, software, and firmware. The term "module" may be interchangeably used with terms such as "unit," "logic," "logical block," "component," or "circuit." The term "module" may refer to the smallest unit of an integrated component or a part thereof. The term "module" may refer to the smallest unit that performs one or more functions or a part thereof. The term "module" may refer to a component that is mechanically or electronically implemented. For example, the term "module" according to various embodiments of the present disclosure may refer to at least one of an Application-Specific Integrated Circuit (ASIC), a Field-Programmable Gate Array (FPGA), and a programmable-logic device for performing operations which are known or will be developed.

According to various embodiments of the present disclosure, at least a part of a device (for example, modules or functions thereof) or a method (for example, operations) according to the various embodiments of the present disclosure may be embodied by, for example, a command stored in a non-transitory computer readable storage medium in a form of a programming module. When the command is executed by one or more processors (for example, the processor 220), the one or more processors may execute a function corresponding to the command. The non-transitory computer-readable storage medium may be, for example, the memory 230. At least a part of the programming module may be implemented (for example, executed) by, for example, the processor 220. At least a part of the programming module may include, for example, a module, a program, a routine, a set of instructions and/or a process for performing one or more functions.

The non-transitory computer readable recoding medium includes magnetic media such include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program command, such as a Read Only Memory (ROM), a Random Access Memory (RAM) and a flash memory. In addition, the program instructions may include high level language code, which can be executed in a computer by using an interpreter, as well as machine code generated by a compiler. The aforementioned hardware device may be configured to operate as one or more software modules in order to perform the operation of various embodiments of the present disclosure, and vice versa.

A programming module according to the present disclosure may include at least one of the described component elements, where a few of the component elements may be omitted, or additional component elements may be included. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

According to an embodiment of the present disclosure, a storage medium storing commands is provided. The commands are configured to allow one or more processors to perform one or more operations when the commands are executed by the one or more processor. The one or more operations may include receiving a request related to contents stored in a first device from a second device communicatively coupled to the first device, by the first device; performing security processing on the contents in response to the request, by the first device; transmitting the security-processed contents to the second device in response to the request, by the first device; and authenticating a user related to the contents in order to release the security processing, by the first device.

According to an embodiment of the present disclosure, a storage medium storing commands is provided. The commands are configured to allow one or more processors to perform one or more operations when the commands are executed by the one or more processor. The one or more operations may include transmitting a request related to contents stored in a first device to the first device communicatively coupled to a second device, by the second device; receiving the contents from the first device in response to the request, by the second device; authenticating a user related to the contents by using the first device, by the second device; and releasing security processing applied to the contents based on user authentication.

A method and an apparatus for sharing contents according to various embodiments of the present disclosure may apply security processing to contents to be shared and necessitating authentication through a source device of the contents to release the security processing, thereby maintain the security of the corresponding contents during a process of sharing the contents among a plurality of electronic devices. For example, access to the corresponding contents through an external device by a user who has no right to access the corresponding contents can be prevented.

Embodiments of the present disclosure provided in the present disclosure and the accompanying drawings are merely certain examples to readily describe the technology associated with embodiments of the present disclosure and to help understanding of the embodiments of the present disclosure, but are not intended limit the scope of the embodiments of the present disclosure. Therefore, in addition to the embodiments disclosed herein, the scope of the present disclosure should be construed to include all modifications or modified forms drawn based on the technical idea of the various embodiments of the present disclosure, as defined by the appended claims and their equivalents.

What is claimed is:

1. A method of a first device, comprising:
receiving a request signal related to contents stored in the first device from a second device communicatively coupled to the first device;
performing security processing on the contents corresponding to the received request signal in response to the request signal;
transmitting the contents to which the security processing is applied, to the second device;
receiving authentication information from a user;
authenticating whether the user has a right to access the contents based on the authentication information; and
transmitting, if the authentication is successful, information related to release of the security of the contents to the second device.

2. The method of claim 1, further comprising:
determining whether to perform security processing on the contents based on attributes of the contents; and
performing the security processing to the contents based on the determination.

3. The method of claim 2, wherein the attributes of the contents are determined based on information recorded in a header of the contents or attributes of a higher group including the contents.

4. The method of claim 2, wherein performing the security processing comprises:
generating an encryption key related to the contents; and
encrypting the contents based on the encryption key;
wherein the encryption key is generated based on at least one of the user's fingerprint information, the user's iris information, the user's voice information, the user's face information, the user's biometric information, a lock pattern, a password, and time information related to a time when the encryption key is generated.

5. The method of claim 2, wherein performing the security processing comprises setting hiding-related attributes of the contents such that the contents are hidden from view of a user of the second device as at least some of the security processing.

6. The method of claim 2, wherein performing the security processing comprises adding information related to a right to access the contents to the contents as at least some of the security processing.

7. The method of claim 1, wherein receiving authentication information comprises:
receiving an additional request signal for releasing the security processing from the second device; and
receiving the authentication information from the user in response to the additional request signal.

8. The method of claim 7, wherein receiving the authentication information comprises:
displaying a user interface for receiving the authentication information by using a display functionally connected to the first device; and
extracting the authentication information from a user input related to the user interface.

9. The method of claim 7, wherein the authentication information includes at least one of the user's fingerprint information, the user's iris information, the user's voice information, the user's face information, the user's biometric information, a lock pattern, and a password.

10. The method of claim 1, wherein the information related to release of the security includes at least one of a decryption key of the contents, a message for accepting or rejecting release of the security, a term related to the release of the security, and a number of times by which access is accepted.

11. The method of claim 10, wherein the decryption key of the contents is generated based on at least one piece of authentication information and time information related to a time when the information related to release of the security is generated.

12. A method of a second device, comprising:
transmitting a first request signal related to contents stored in a first device to the first device communicatively coupled to the second device;
receiving the contents from the first device in response to the first request signal, wherein the received contents are secured by the first device;
transmitting a second request signal for authenticating a user related to contents to the first device;
receiving information related to release of the security of contents from the first device in response to the second request signal; and
releasing security applied to the contents based on the received information.

13. The method of claim 12, wherein further comprising:
identifying user information related to the contents;
determining whether the user has a right to access the contents based on the user information; and
releasing the security based on the determination.

14. The method of claim 12, wherein releasing the security comprises displaying, for a user, an expression corresponding to a state where the security is released through a display functionally connected to the second device.

15. The method of claim 12, further comprising displaying, for a user, a first expression corresponding to a state where the security is not released through a display functionally connected to the second device, wherein the first expression corresponding to the state where the security is not released is different from a second expression corresponding to a state where the security processing is released.

16. The method of claim 12, wherein the information includes at least one of a decryption key of the contents, a message for accepting or rejecting release of the security, a term related to the release of the security, and a number of times by which access is accepted.

17. The method of claim 12, wherein further comprising:
detecting a predetermined event generated in the second device; and
reconstructing the security in the contents in which the security is released in response to the event.

18. An electronic device, comprising:
a communication interface; and
a processor configured to:
receive a request signal related to contents stored in the first device from a second device communicatively coupled to the first device, via the communication interface;
perform security processing on the contents corresponding to the received request signal in response to the request signal;

control the communication interface to transmit the contents to which the security processing is applied, to the second device;
receive authentication information from a user;
authenticate whether the user has a right to access the contents based on the authentication information release the security of the contents by authenticating a user related to the contents; and
control the communication interface to transmit information related to release of the security to the second device if the authentication is successful.

19. An electronic device, comprising:
a communication interface; and
a processor configured to:
control the communication interface to transmit a first request signal related to contents stored in a first device to the first device communicatively coupled to a second device;
receive the contents from the first device in response to the first request signal, via the communication interface, wherein the received contents are secured by the first device;
control the communication interface to transmit a second request signal for authenticating a user related to contents to the first device;
receive information related to release of the security of contents from the first device in response to the second request signal, via the communication interface; and
release security applied to the contents based on the received information.

* * * * *